US012568239B2

(12) United States Patent
Jhu et al.

(10) Patent No.: US 12,568,239 B2
(45) Date of Patent: Mar. 3, 2026

(54) RESIDUAL AND COEFFICIENTS CODING FOR VIDEO CODING

(71) Applicant: BEIJING DAJIA INTERNET INFORMATION TECHNOLOGY CO., LTD., Beijing (CN)

(72) Inventors: Hong-Jheng Jhu, San Diego, CA (US); Xiaoyu Xiu, San Diego, CA (US); Yi-Wen Chen, San Diego, CA (US); Wei Chen, San Diego, CA (US); Che-Wei Kuo, San Diego, CA (US); Ning Yan, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 109 days.

(21) Appl. No.: 18/403,715

(22) Filed: Jan. 3, 2024

(65) Prior Publication Data

US 2024/0388730 A1 Nov. 21, 2024

Related U.S. Application Data

(63) Continuation of application No. PCT/US2022/036585, filed on Jul. 8, 2022.
(Continued)

(51) Int. Cl.
*H04N 19/00* (2014.01)
*H04N 19/184* (2014.01)
*H04N 19/44* (2014.01)

(52) U.S. Cl.
CPC ........... *H04N 19/44* (2014.11); *H04N 19/184* (2014.11)

(58) Field of Classification Search
None
See application file for complete search history.

(56) References Cited

U.S. PATENT DOCUMENTS 9,467,700 B2 10/2016 Wang et al.
2015/0098503 A1 4/2015 Pu et al.
(Continued)

FOREIGN PATENT DOCUMENTS

CN 105075262 A 11/2015
CN 105264888 A 1/2016
(Continued)

OTHER PUBLICATIONS

Tianyang Zhou, "AHG8: Transform coefficients range extension for high bit-depth coding", Document: JVET-U0052_v2, Joint Video Experts Team (JVET) of ITU-T SG 16 WP 3 and ISO/IEC JTC 1/SC 29,21st Meeting, by teleconference, Jan. 6-15, 2021.(8P).
(Continued)

*Primary Examiner* — Zhihan Zhou
(74) *Attorney, Agent, or Firm* — Arch & Lake LLP; Hao Tan; Shen Wang

(57) ABSTRACT

Methods, apparatuses, and non-transitory computer-readable storage mediums are provided for video decoding. In one method, a decoder determines a coding bit depth for at least one sample in a bitstream; the decoder determines a value of a first Sequence Parameter Set (SPS) flag for the at least one sample; and the decoder further determines a second SPS flag for the at least one sample based on the value of the first SPS flag in combination of a coding bit depth for the at least one sample.

15 Claims, 16 Drawing Sheets

Related U.S. Application Data

(60) Provisional application No. 63/220,380, filed on Jul. 9, 2021.

(56) References Cited

U.S. PATENT DOCUMENTS

| | | | |
|---|---|---|---|
| 2017/0006289 A1 | 1/2017 | Alshina et al. | |
| 2020/0244992 A1 | 7/2020 | Li et al. | |
| 2025/0071307 A1* | 2/2025 | Tsukuba | H04N 19/91 |

FOREIGN PATENT DOCUMENTS

| | | |
|---|---|---|
| JP | 2016538749 A | 12/2016 |
| WO | 2022255395 A1 | 12/2022 |

OTHER PUBLICATIONS

Hong-Jheng Jhu et al. "CE-2.1: Slice based Rice parameter selection for transform skip residual coding", Document: JVET-V0054-r1, Joint Video Experts Team (JVET) of ITU-T SG 16 WP 3 and ISO/IEC JTC 1/SC 29, 22nd Meeting, by teleconference, Apr. 20-28, 2021.(6P).

First Office Action of the counterpart Russian application No. 2024102161(Official mailing date: Mar. 4, 2024).

The Supplementary European Search Report issued in EP Application No. 22838496.2 dated Apr. 3, 2025, (8p).

Karam Naser et al., "[AHG8] SPS Cleanup for VVC operation range extension," Joint Video Experts Team (JVET) of ITU-T SG 16 WP 3 and ISO/IEC JTC 1/SC 29, JVET-W0070, 23rd Meeting, by teleconference, Jul. 7-16, 2021, (4p).

Frank Bossen et al., "VVC operation range extension (Draft 3)," Joint Video Experts Team (JVET) of ITU-T SG 16 WP 3 and ISO/IEC JTC 1/SC 29, JVET-V2005-v1, 22nd Meeting, by teleconference, Apr. 20-28, 2021, (19p).

Karam Naser et al., "[AHG8] SPS Cleanup for VVC operation range extension", Joint Video Experts Team (JVET) of ITU-T SG 16 WP 3 and ISO/IEC JTC 1/SC 29, Document: JVET-W0070, 23rd Meeting, by teleconference, Jul. 7-16, 2021, (4p).

Hong-Jheng Jhu et al., "AHG8: On signalling of sps_ts_residual_coding_rice_present_in_sh_flag", Joint Video Experts Team (JVET) of ITU-T SG 16 WP 3 and ISO/IEC JTC 1/SC 29, Document: JVET-W0121, 23rd Meeting, by teleconference, Jul. 7-16, 2021, (2p).

International Search Report of PCT/US2022/036585 dated Nov. 1, 2022 (3p).

* cited by examiner

1700

Receive a video input.

1710

Signal a rice parameter of binary codewords for coding syntax elements.

1712

Entropy encode a video bitstream based on the rice parameter and the video input.

1714

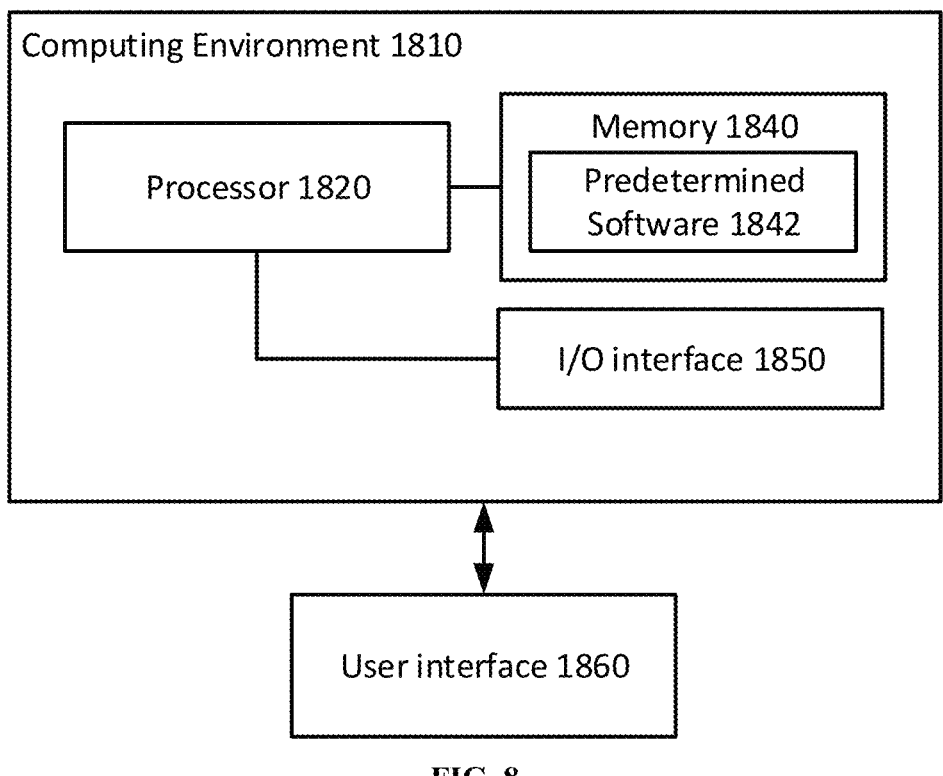

FIG. 8

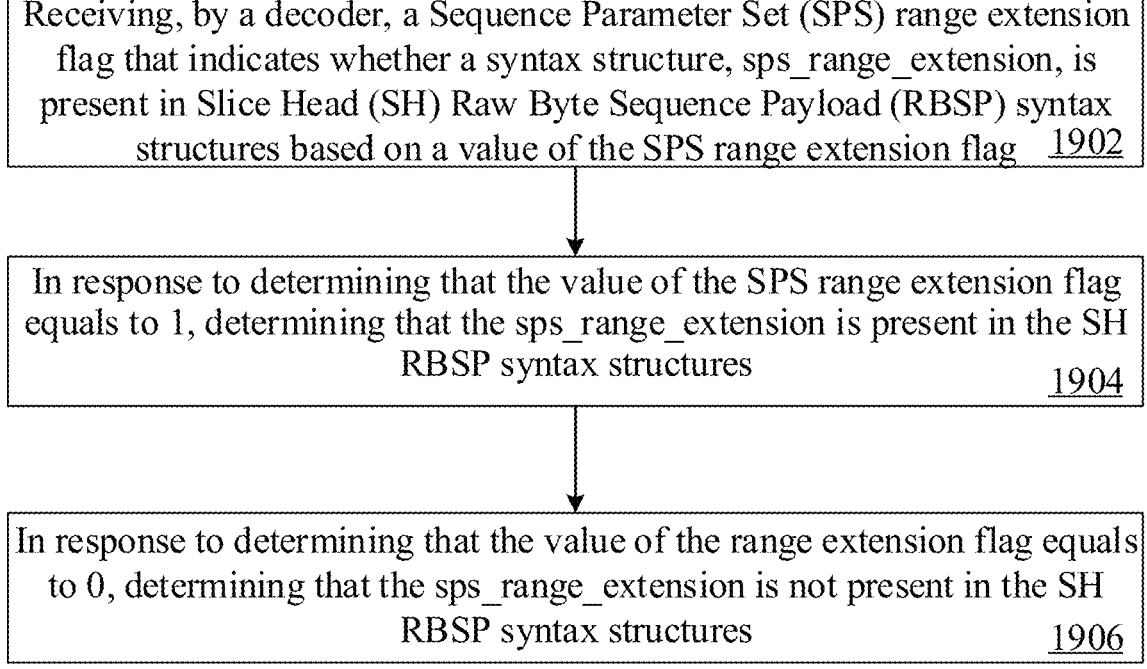

Receiving, by a decoder, a Sequence Parameter Set (SPS) range extension flag that indicates whether a syntax structure, sps_range_extension, is present in Slice Head (SH) Raw Byte Sequence Payload (RBSP) syntax structures based on a value of the SPS range extension flag   1902

In response to determining that the value of the SPS range extension flag equals to 1, determining that the sps_range_extension is present in the SH RBSP syntax structures   1904

In response to determining that the value of the range extension flag equals to 0, determining that the sps_range_extension is not present in the SH RBSP syntax structures   1906

FIG. 9

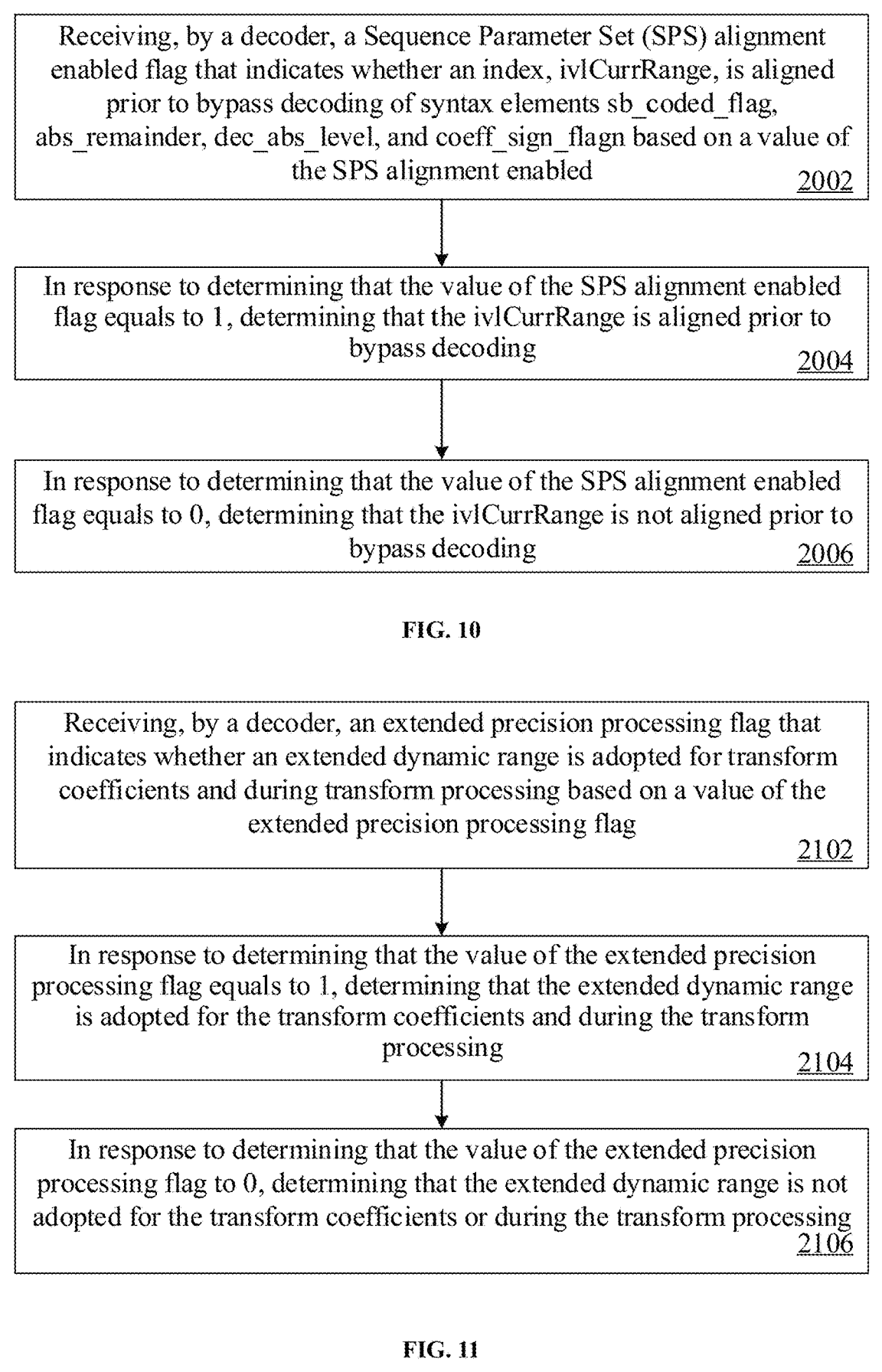

Receiving, by a decoder, a Sequence Parameter Set (SPS) alignment enabled flag that indicates whether an index, ivlCurrRange, is aligned prior to bypass decoding of syntax elements sb_coded_flag, abs_remainder, dec_abs_level, and coeff_sign_flagn based on a value of the SPS alignment enabled    2002

In response to determining that the value of the SPS alignment enabled flag equals to 1, determining that the ivlCurrRange is aligned prior to bypass decoding    2004

In response to determining that the value of the SPS alignment enabled flag equals to 0, determining that the ivlCurrRange is not aligned prior to bypass decoding    2006

FIG. 10

Receiving, by a decoder, an extended precision processing flag that indicates whether an extended dynamic range is adopted for transform coefficients and during transform processing based on a value of the extended precision processing flag    2102

In response to determining that the value of the extended precision processing flag equals to 1, determining that the extended dynamic range is adopted for the transform coefficients and during the transform processing    2104

In response to determining that the value of the extended precision processing flag to 0, determining that the extended dynamic range is not adopted for the transform coefficients or during the transform processing    2106

FIG. 11

Receiving, by a decoder, a persistent rice adaption enabled flag that indicates whether a rice parameter derivation for binarization of abs_remaining and dec_abs_level is initialized at start of each sub-block adopting mode dependent statistics accumulated from previous sub-blocks based on a value of the persistent rice adaption enabled flag   2202

In response to determining that the value of the persistent rice adaption enabled flag equals to 1, determining that the rice parameter derivation for binarization is initialized at the start of each sub-block adopting mode dependent statistics accumulated from the previous sub-blocks 2204

In response to determining that the value of the persistent rice adaption enabled flag to 0, determining that no previous sub-block state is adopted in the rice parameter derivation   2206

FIG. 12

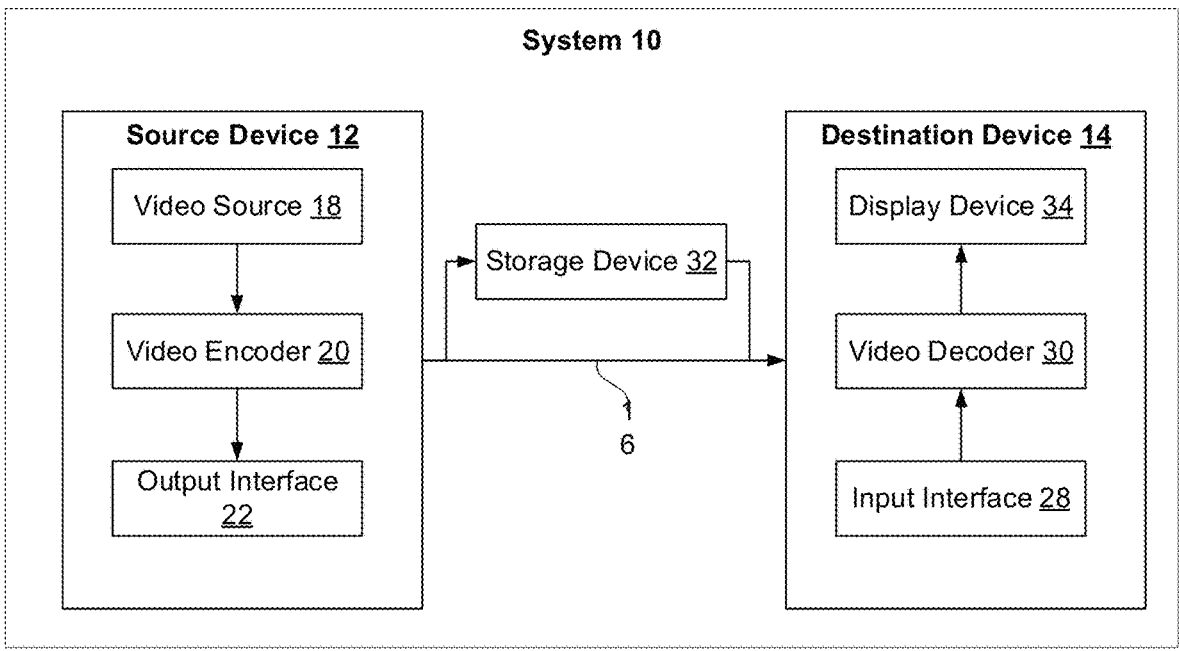

FIG. 13

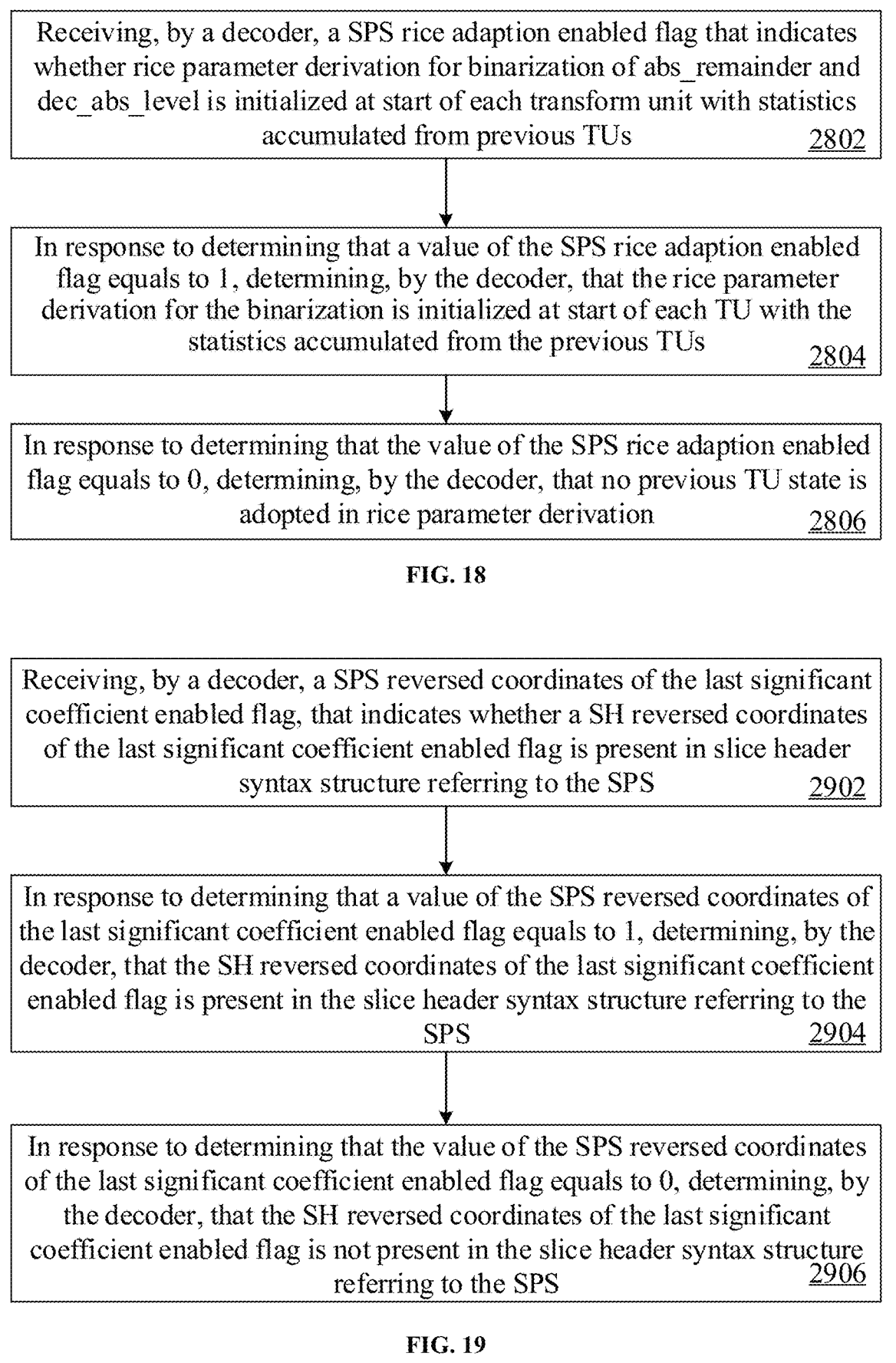

Receiving, by a decoder, a SPS rice adaption enabled flag that indicates whether rice parameter derivation for binarization of abs_remainder and dec_abs_level is initialized at start of each transform unit with statistics accumulated from previous TUs            2802

In response to determining that a value of the SPS rice adaption enabled flag equals to 1, determining, by the decoder, that the rice parameter derivation for the binarization is initialized at start of each TU with the statistics accumulated from the previous TUs            2804

In response to determining that the value of the SPS rice adaption enabled flag equals to 0, determining, by the decoder, that no previous TU state is adopted in rice parameter derivation            2806

FIG. 18

Receiving, by a decoder, a SPS reversed coordinates of the last significant coefficient enabled flag, that indicates whether a SH reversed coordinates of the last significant coefficient enabled flag is present in slice header syntax structure referring to the SPS            2902

In response to determining that a value of the SPS reversed coordinates of the last significant coefficient enabled flag equals to 1, determining, by the decoder, that the SH reversed coordinates of the last significant coefficient enabled flag is present in the slice header syntax structure referring to the SPS            2904

In response to determining that the value of the SPS reversed coordinates of the last significant coefficient enabled flag equals to 0, determining, by the decoder, that the SH reversed coordinates of the last significant coefficient enabled flag is not present in the slice header syntax structure referring to the SPS            2906

FIG. 19

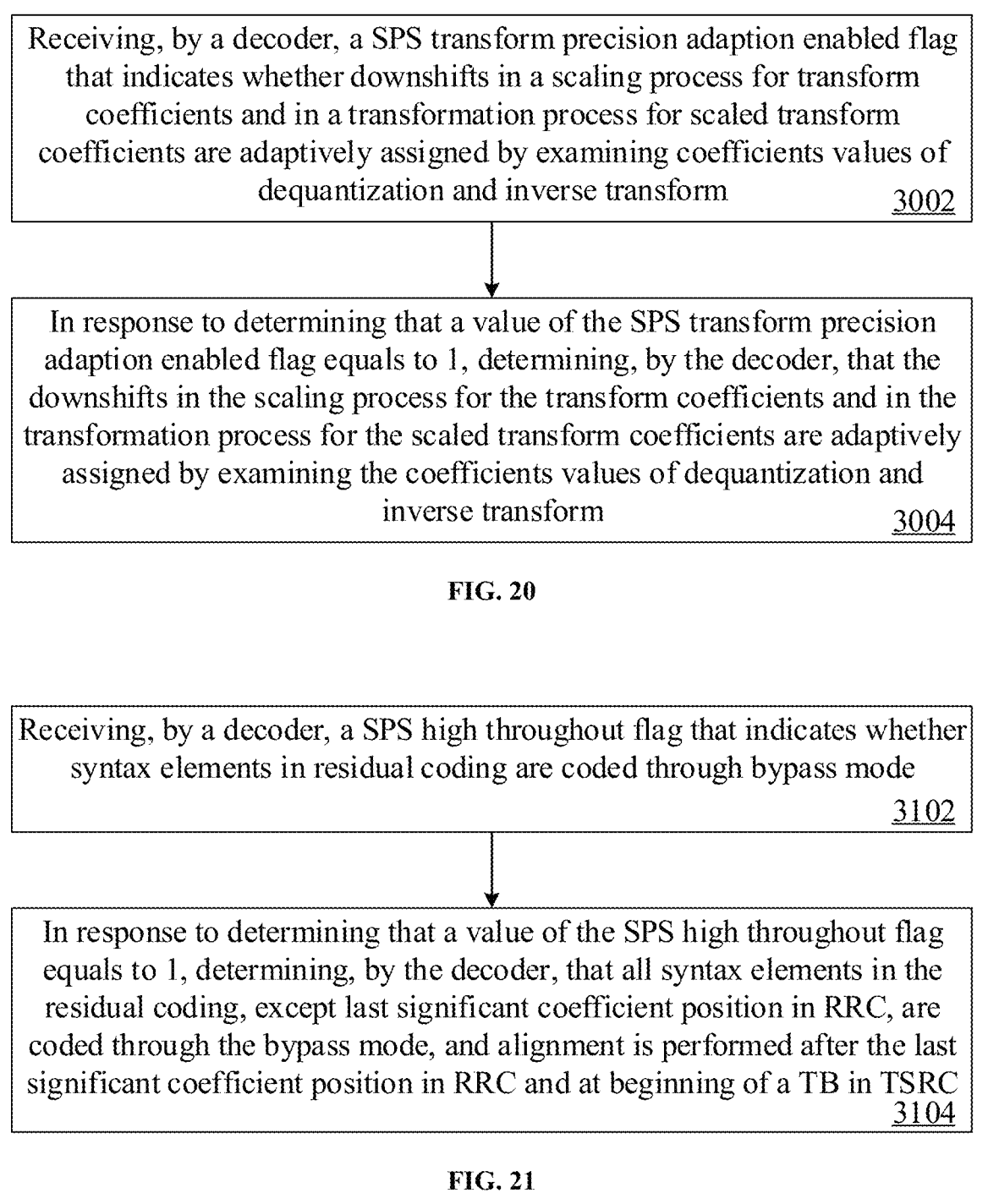

Receiving, by a decoder, a SPS transform precision adaption enabled flag that indicates whether downshifts in a scaling process for transform coefficients and in a transformation process for scaled transform coefficients are adaptively assigned by examining coefficients values of dequantization and inverse transform     3002

In response to determining that a value of the SPS transform precision adaption enabled flag equals to 1, determining, by the decoder, that the downshifts in the scaling process for the transform coefficients and in the transformation process for the scaled transform coefficients are adaptively assigned by examining the coefficients values of dequantization and inverse transform     3004

FIG. 20

Receiving, by a decoder, a SPS high throughout flag that indicates whether syntax elements in residual coding are coded through bypass mode     3102

In response to determining that a value of the SPS high throughout flag equals to 1, determining, by the decoder, that all syntax elements in the residual coding, except last significant coefficient position in RRC, are coded through the bypass mode, and alignment is performed after the last significant coefficient position in RRC and at beginning of a TB in TSRC     3104

FIG. 21

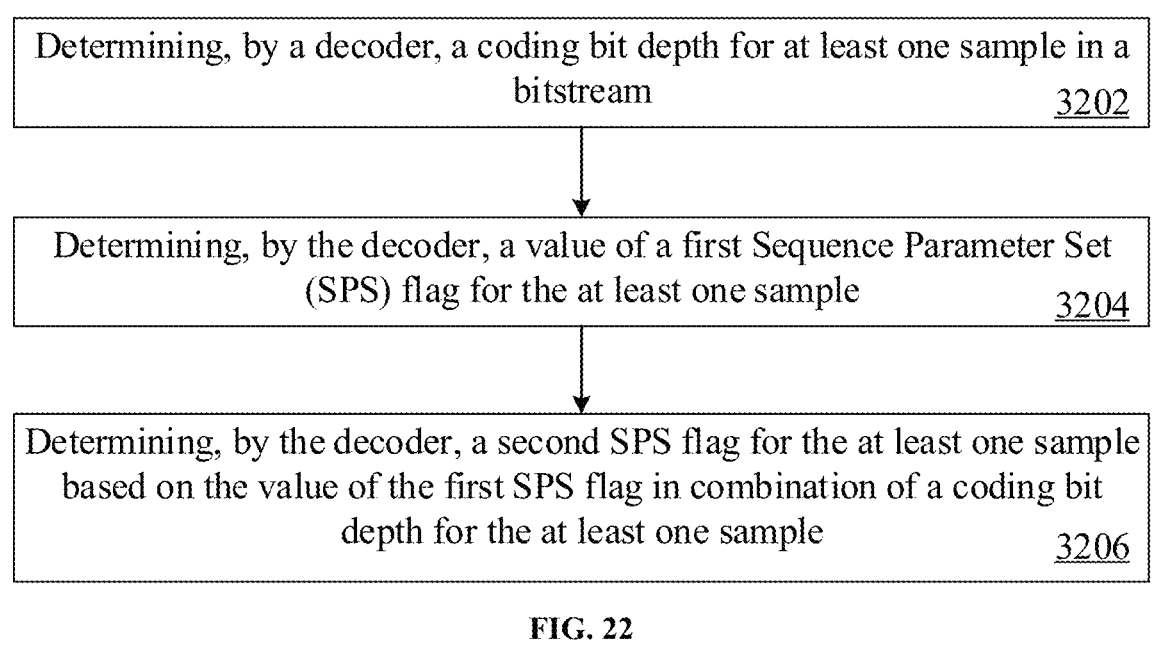

Determining, by a decoder, a coding bit depth for at least one sample in a bitstream        3202

Determining, by the decoder, a value of a first Sequence Parameter Set (SPS) flag for the at least one sample        3204

Determining, by the decoder, a second SPS flag for the at least one sample based on the value of the first SPS flag in combination of a coding bit depth for the at least one sample        3206

FIG. 22

RESIDUAL AND COEFFICIENTS CODING FOR VIDEO CODING

CROSS-REFERENCE TO RELATED APPLICATION

This application is a continuation of PCT Application No. PCT/US2022/036585, entitled "RESIDUAL AND COEFFICIENTS CODING FOR VIDEO CODING" filed Jul. 8, 2022, which is based upon and claims priority to Provisional Applications No. 63/220,380 filed on Jul. 9, 2021, all of which are incorporated by reference in their entireties for all purposes.

TECHNICAL FIELD

This disclosure is related to video coding and compression. More specifically, this disclosure relates to the improvements and simplifications of the residual and coefficients coding for video coding.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

SUMMARY

Examples of the present disclosure provide methods and apparatus for video coding.

According to the present disclosure, a method for video decoding is provided. The method may include: determining, by a decoder, a coding bit depth for at least one sample in a bitstream; determining, by the decoder, a value of a first SPS flag for the at least one sample; and determining, by the decoder, a second SPS flag for the at least one sample based on the value of the first SPS flag in combination of a coding bit depth for the at least one sample.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 8 is a diagram illustrating a computing environment coupled with a user interface, according to an example of the present disclosure.

FIG. 9 illustrates a method for video coding, according to an example of the present disclosure.

FIG. 10 illustrates a method for video coding, according to an example of the present disclosure.

FIG. 11 illustrates a method for video coding, according to an example of the present disclosure.

FIG. 12 illustrates a method for video coding, according to an example of the present disclosure.

FIG. 13 is a block diagram illustrating an exemplary system for encoding and decoding video blocks according to an example of the present disclosure.

FIG. 18 illustrates a method for video decoding, according to an example of the present disclosure.

FIG. 19 illustrates a method for video decoding, according to an example of the present disclosure.

FIG. 20 illustrates a method for video decoding, according to an example of the present disclosure.

FIG. 21 illustrates a method for video decoding, according to an example of the present disclosure.

FIG. 22 illustrates a method for video decoding, according to an example of the present disclosure.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc., may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

Figure 1:
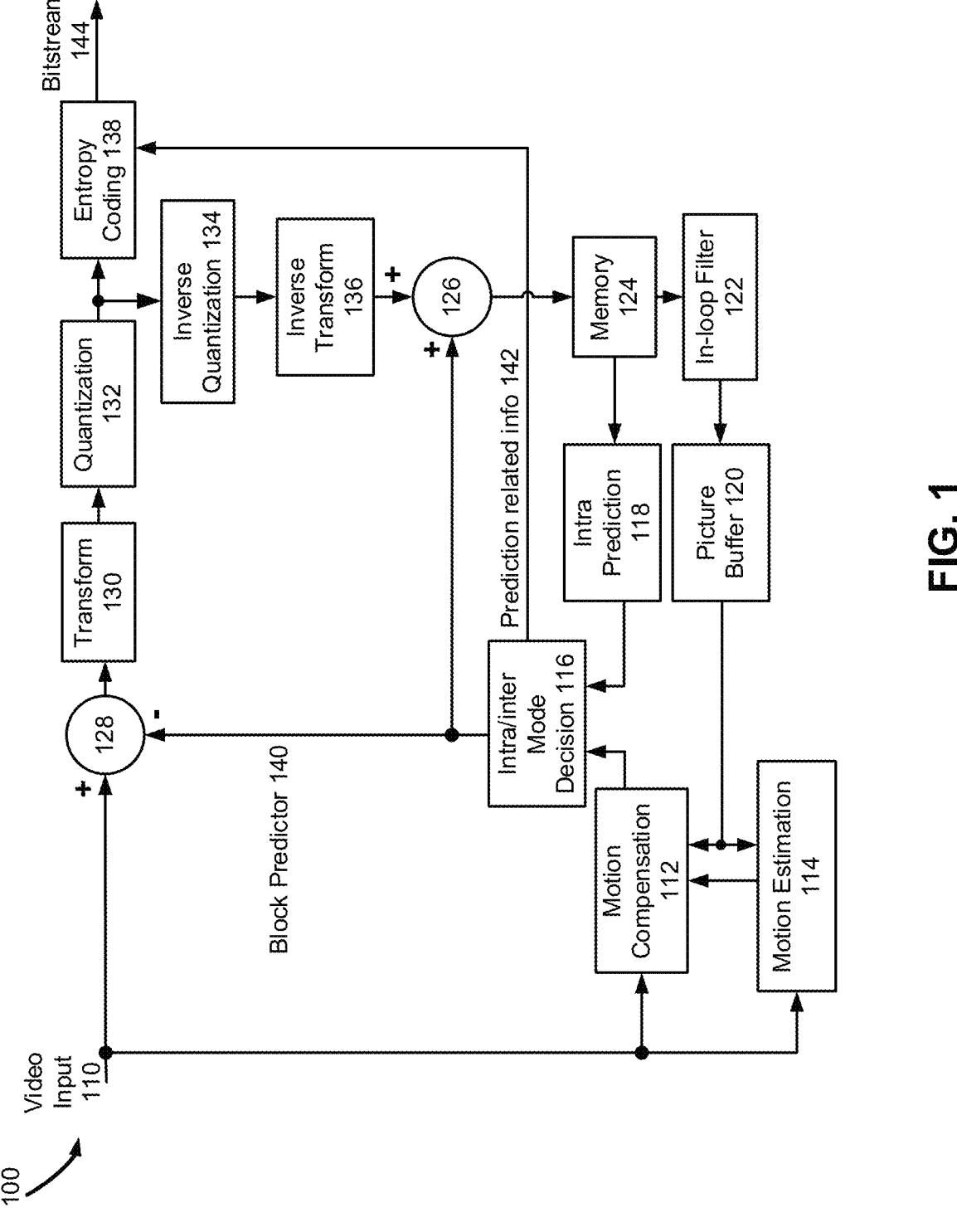
FIG. 1 is a block diagram of an encoder, according to an example of the present disclosure.

FIG. 1 shows a general diagram of a block-based video encoder for the VVC. Specifically, FIG. 1 shows a typical encoder 100. The encoder 100 has video input 110, motion compensation 112, motion estimation 114, intra/inter mode decision 116, block predictor 140, adder 128, transform 130, quantization 132, prediction related info 142, intra prediction 118, picture buffer 120, inverse quantization 134, inverse transform 136, adder 126, memory 124, in-loop filter 122, entropy coding 138, and bitstream 144.

In the encoder 100, a video frame is partitioned into a plurality of video blocks for processing. For each given video block, a prediction is formed based on either an inter prediction approach or an intra prediction approach.

A prediction residual, representing the difference between a current video block, part of video input 110, and its predictor, part of block predictor 140, is sent to a transform 130 from adder 128. Transform coefficients are then sent from the Transform 130 to a Quantization 132 for entropy reduction. Quantized coefficients are then fed to an Entropy Coding 138 to generate a compressed video bitstream. As shown in FIG. 1, prediction related information 142 from an intra/inter mode decision 116, such as video block partition info, motion vectors (MVs), reference picture index, and intra prediction mode, are also fed through the Entropy Coding 138 and saved into a compressed bitstream 144. Compressed bitstream 144 includes a video bitstream.

In the encoder 100, decoder-related circuitries are also needed in order to reconstruct pixels for the purpose of prediction. First, a prediction residual is reconstructed through an Inverse Quantization 134 and an Inverse Transform 136. This reconstructed prediction residual is combined with a Block Predictor 140 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. The temporal prediction signal for a given coding unit (CU) or coding block is usually signaled by one or more MVs, which indicate the amount and the direction of motion between the current CU and its temporal reference. Further, if multiple reference pictures are supported, one reference picture index is additionally sent, which is used to identify from which reference picture in the reference picture storage, the temporal prediction signal comes from.

Motion estimation 114 intakes video input 110 and a signal from picture buffer 120 and output, to motion compensation 112, a motion estimation signal. Motion compensation 112 intakes video input 110, a signal from picture buffer 120, and motion estimation signal from motion estimation 114 and output to intra/inter mode decision 116, a motion compensation signal.

After spatial and/or temporal prediction is performed, an intra/inter mode decision 116 in the encoder 100 chooses the best prediction mode, for example, based on the rate-distortion optimization method. The block predictor 140 is then subtracted from the current video block, and the resulting prediction residual is de-correlated using the transform 130 and the quantization 132. The resulting quantized residual coefficients are inverse quantized by the inverse quantization 134 and inverse transformed by the inverse transform 136 to form the reconstructed residual, which is then added back to the prediction block to form the reconstructed signal of the CU. Further in-loop filtering 122, such as a deblocking filter, a sample adaptive offset (SAO), and/or an adaptive in-loop filter (ALF) may be applied on the reconstructed CU before it is put in the reference picture storage of the picture buffer 120 and used to code future video blocks. To form the output video bitstream 144, coding mode (inter or intra), prediction mode information, motion information, and quantized residual coefficients are all sent to the entropy coding unit 138 to be further compressed and packed to form the bitstream.

FIG. 1 gives the block diagram of a generic block-based hybrid video encoding system. The input video signal is processed block by block (called coding units (CUs)). In VTM-1.0, a CU can be up to 128×128 pixels. However, different from the HEVC which partitions blocks only based on quad-trees, in the VVC, one coding tree unit (CTU) is split into CUs to adapt to varying local characteristics based on quad/binary/ternary-tree. By definition, coding tree block (CTB) is an N×N block of samples for some value of N such that the division of a component into CTBs is a partitioning. CTU includes a CTB of luma samples, two corresponding CTBs of chroma samples of a picture that has three sample arrays, or a CTB of samples of a monochrome picture or a picture that is coded using three separate colour planes and syntax structures used to code the samples. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure. As shown in FIGS. 3A, 3B, 3C, 3D, and 3E, there are five splitting types, quaternary partitioning, horizontal binary partitioning, vertical binary partitioning, horizontal ternary partitioning, and vertical ternary partitioning.

Figures 3A, 3B, 3C, 3D, 3E:
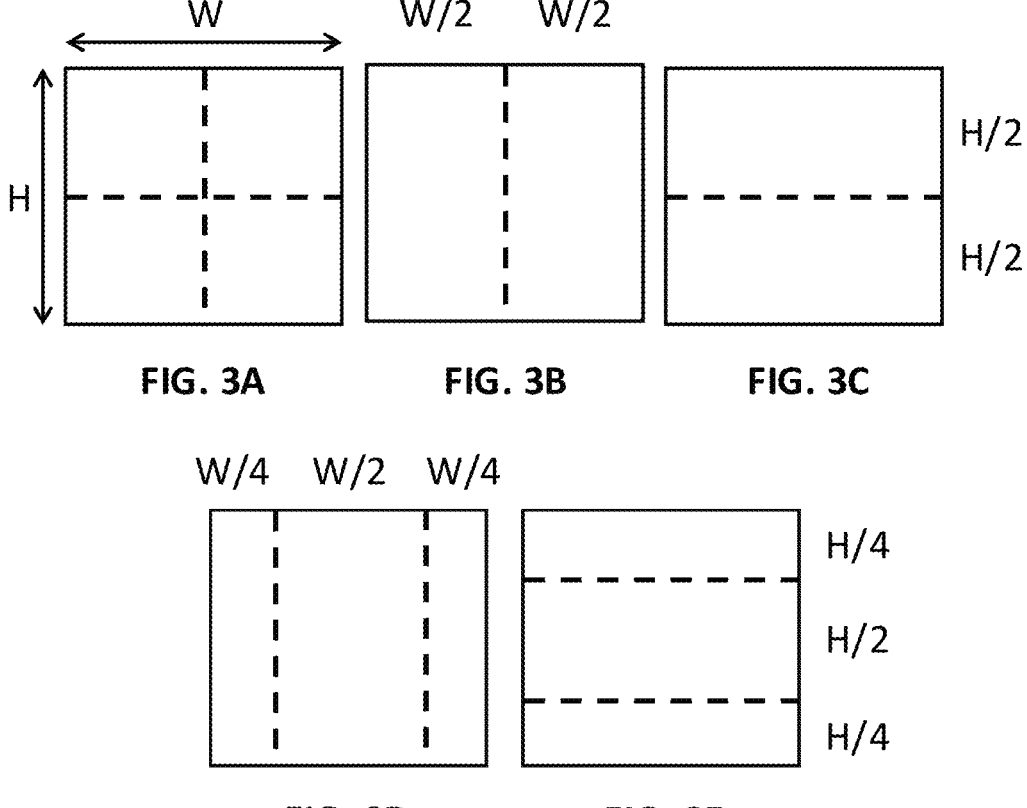
FIG. 3A is a diagram illustrating block partitions in a multi-type tree structure, according to an example of the present disclosure.
FIG. 3B is a diagram illustrating block partitions in a multi-type tree structure, according to an example of the present disclosure.
FIG. 3C is a diagram illustrating block partitions in a multi-type tree structure, according to an example of the present disclosure.
FIG. 3D is a diagram illustrating block partitions in a multi-type tree structure, according to an example of the present disclosure.
FIG. 3E is a diagram illustrating block partitions in a multi-type tree structure, according to an example of the present disclosure.

FIG. 3A shows a diagram illustrating block quaternary partition in a multi-type tree structure, in accordance with the present disclosure.

FIG. 3B shows a diagram illustrating block vertical binary partition in a multi-type tree structure, in accordance with the present disclosure.

FIG. 3C shows a diagram illustrating block horizontal binary partition in a multi-type tree structure, in accordance with the present disclosure.

FIG. 3D shows a diagram illustrating block vertical ternary partition in a multi-type tree structure, in accordance with the present disclosure.

FIG. 3E shows a diagram illustrating block horizontal ternary partition in a multi-type tree structure, in accordance with the present disclosure.

In FIG. 1, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes. After spatial and/or temporal prediction, the mode decision block in the encoder chooses the best prediction mode, for example based on the rate-distortion optimization method. The prediction block is then subtracted from the current video block; and the prediction residual is de-correlated using transform and quantized. The quantized residual coefficients are inverse quantized and inverse transformed to form the reconstructed residual, which is then added back to the prediction block to form the reconstructed signal of the CU. Further in-loop filtering, such as deblocking filter, sample adaptive offset (SAO) and adaptive in-loop filter (ALF) may be applied on the reconstructed CU before it is put in the reference picture store and used to code future video blocks. To form the output video bit-stream, coding mode (inter or intra), prediction mode information, motion information, and quantized residual coefficients are all sent to the entropy coding unit to be further compressed and packed to form the bit-stream.

Figure 2:
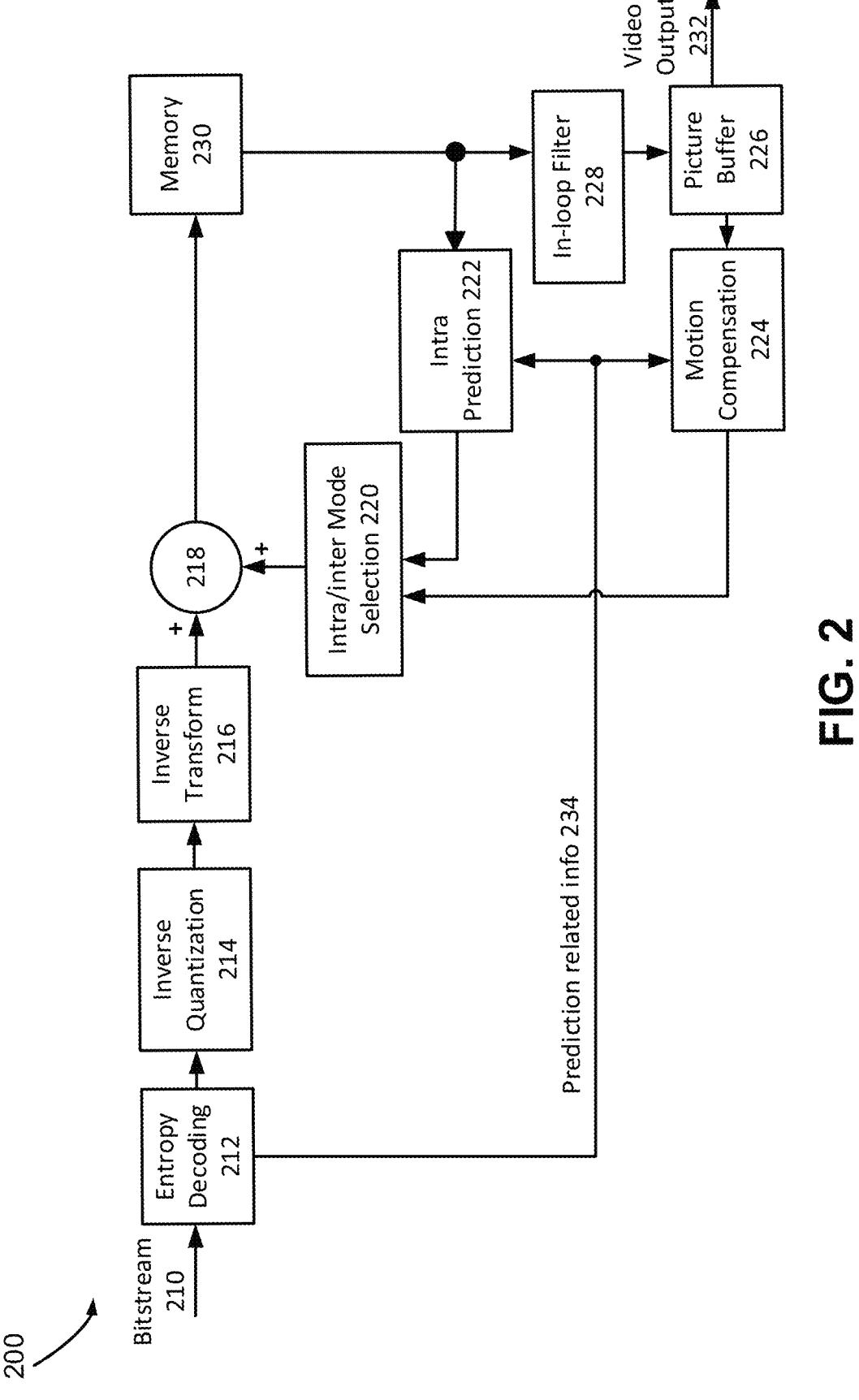
FIG. 2 is a block diagram of a decoder, according to an example of the present disclosure.

FIG. 2 shows a general block diagram of a video decoder for the VVC. Specifically, FIG. 2 shows a typical decoder 200 block diagram. Decoder 200 has bitstream 210, entropy decoding 212, inverse quantization 214, inverse transform 216, adder 218, intra/inter mode selection 220, intra prediction 222, memory 230, in-loop filter 228, motion compensation 224, picture buffer 226, prediction related info 234, and video output 232.

Decoder 200 is similar to the reconstruction-related section residing in the encoder 100 of FIG. 1. In the decoder 200, an incoming video bitstream 210 is first decoded through an Entropy Decoding 212 to derive quantized coefficient levels and prediction-related information. The quantized coefficient levels are then processed through an Inverse Quantization 214 and an Inverse Transform 216 to obtain a reconstructed prediction residual. A block predictor mechanism, implemented in an Intra/inter Mode Selector 220, is configured to perform either an Intra Prediction 222 or a Motion Compensation 224, based on decoded prediction information. A set of unfiltered reconstructed pixels is obtained by summing up the reconstructed prediction residual from the Inverse Transform 216 and a predictive output generated by the block predictor mechanism, using a summer 218.

The reconstructed block may further go through an In-Loop Filter 228 before it is stored in a Picture Buffer 226, which functions as a reference picture store. The reconstructed video in the Picture Buffer 226 may be sent to drive a display device, as well as used to predict future video blocks. In situations where the In-Loop Filter 228 is turned on, a filtering operation is performed on these reconstructed pixels to derive a final reconstructed Video Output 232.

FIG. 2 gives a general block diagram of a block-based video decoder. The video bit-stream is first entropy decoded at entropy decoding unit. The coding mode and prediction information are sent to either the spatial prediction unit (if intra coded) or the temporal prediction unit (if inter coded) to form the prediction block. The residual transform coefficients are sent to inverse quantization unit and inverse transform unit to reconstruct the residual block. The prediction block and the residual block are then added together. The reconstructed block may further go through in-loop filtering before it is stored in reference picture store. The reconstructed video in reference picture store is then sent out to drive a display device, as well as used to predict future video blocks.

Transform Coefficient Coding in VVC

Figure 4:
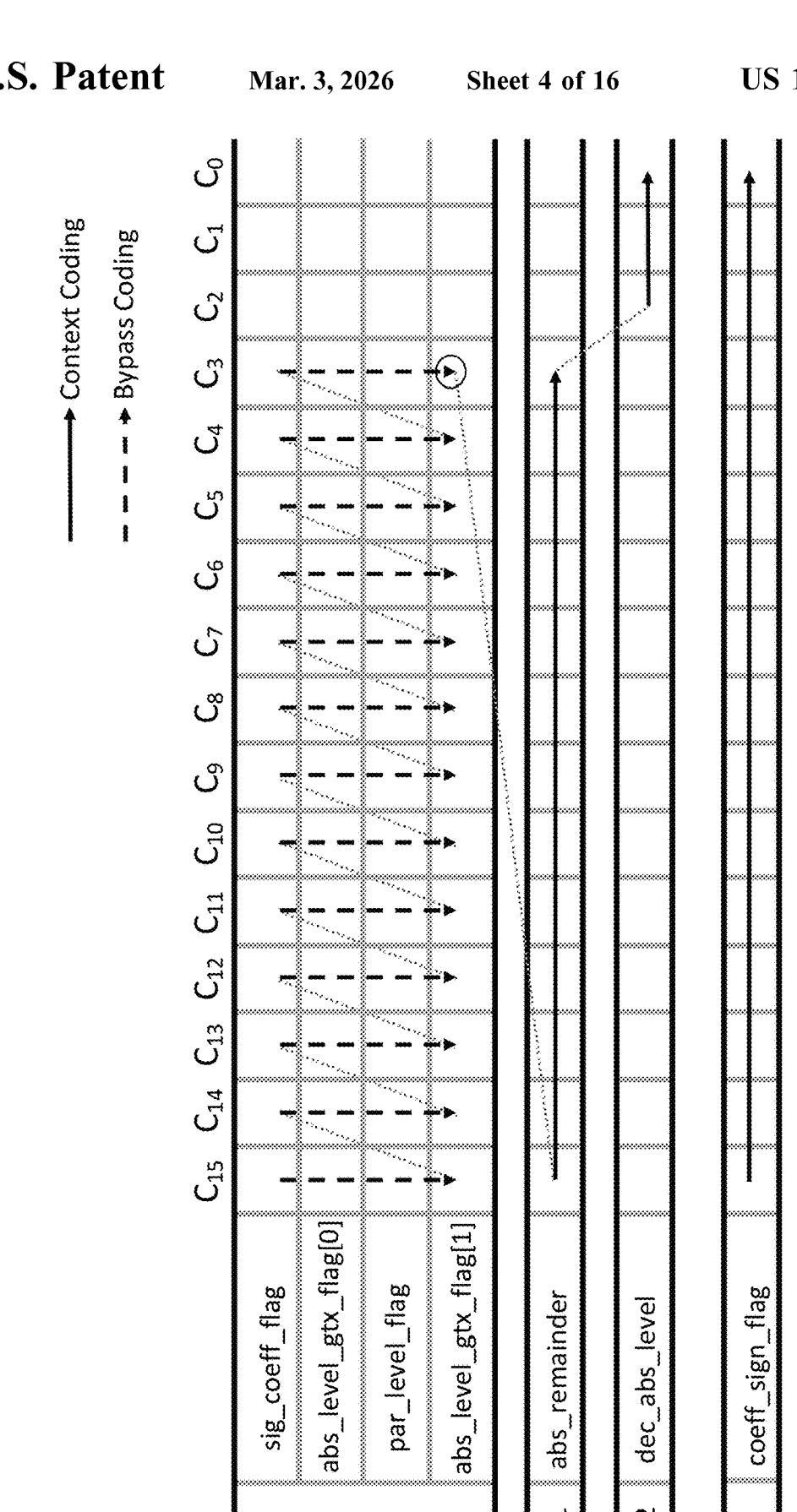
FIG. 4 is an illustration of a residual coding structure for transform blocks, according to an example of the present disclosure.

In transform coefficient coding in VVC, a variable, remBinsPass1, is first set to the maximum number of context-coded bins (MCCB) allowed. In the coding process, the variable is decreased by one each time when a context-coded bin is signaled. While the remBinsPass1 is larger than or equal to four, a coefficient is firstly signaled through syntaxes of sig_coeff_flag, abs_level_gt1_flag, par_level_flag, and abs_level_gt3_flag, all using context-coded bins in the first pass. The rest part of level information of the coefficient is coded with syntax element of abs_remainder using Golomb-rice code and bypass-coded bins in the second pass. When the remBinsPass1 becomes smaller than 4 while coding the first pass, a current coefficient is not coded in the first pass, but directly coded in the second pass with the syntax element of dec_abs_level using Golomb-Rice code and bypass-coded bins. The rice parameter derivation process for dec_abs_level[ ] is derived as specified in Table 1A. After all the above mentioned level coding, the signs (sign_flag) for all scan positions with sig_coeff_flag equal to 1 is finally coded as bypass bins. Such a process is depicted in FIG. 4. The remBinsPass1 is reset for every TB. The transition of using context-coded bins for the sig_coeff_flag, abs_level_gt1_flag, par_level_flag, and abs_level_gt3_flag to using bypass-coded bins for the rest coefficients only happens at most once per TB. For a coefficient subblock, if the remBinsPass1 is smaller than 4 before coding its very first coefficient, the entire coefficient subblock is coded using bypass-coded bins.

FIG. 4 shows an illustration of residual coding structure for transform blocks.

TABLE 1A

Rice parameter derivation process for abs_remainder[ ] and dec_abs_level[ ]

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.

Output of this process is the Rice parameter cRiceParam.

Given the array AbsLevel[ x ][ y ] for the transform block with component index cIdx and the top-left luma location ( x0, y0 ), the variable locSumAbs is derived as specified by the following pseudo code:

```
locSumAbs = 0
if( xC < (1 << log2TbWidth) - 1 ) {
    locSumAbs += AbsLevel[ xC + 1 ][ yC ]
    if( xC < (1 << log2TbWidth) - 2 )
        locSumAbs += AbsLevel[ xC + 2 ][ yC ]
    if( yC < (1 << log2TbHeight) - 1 )
        locSumAbs += AbsLevel[ xC + 1 ][ yC + 1 ]           (1494)
}
if( yC < (1 << log2TbHeight) - 1 ) {
    locSumAbs += AbsLevel [ xC ][ yC + 1 ]
    if( yC < (1 << log2TbHeight) - 2 )
        locSumAbs += AbsLevel[ xC ][ yC + 2 ]
}
locSumAbs = Clip3( 0, 31, locSumAbs - baseLevel * 5 )
```

Given the variable locSumAbs, the Rice parameter cRiceParam is derived as specified in Table 1B below.

When baseLevel is equal to 0, the variable ZeroPos[ n ] is derived as follows:

ZeroPos[ n ] = ( QState < 2 ? 1 : 2 ) << cRiceParam

TABLE 1B

Specification of cRiceParam based on locSumAbs

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |

Residual Coding for Transform Skip Mode in VVC

Figure 5:
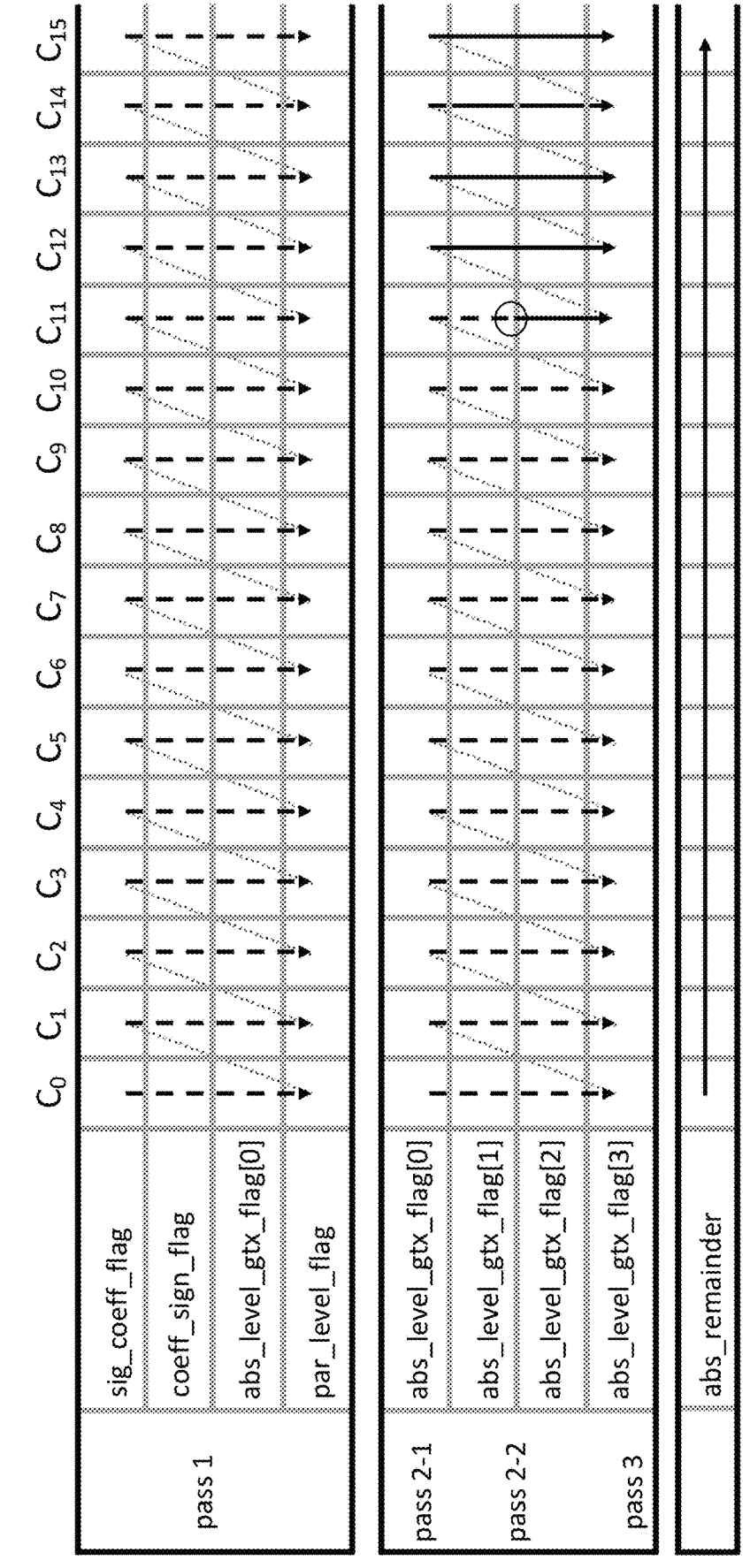
FIG. 5 is an illustration of a residual coding structure for transform skip blocks, according to an example of the present disclosure.

In transform skip mode, the statistical characteristics of residual signal are different from those of transform coefficients, and no energy compaction around low-frequency components is observed. The residual coding is modified to account for the different signal characteristics of the (spatial) transform skip residual FIG. 5 shows an illustration of residual coding structure for transform skip blocks.

General Constraint Information

The GCI structure contains several types of constraint syntax elements, including: Flags for general bitstream restrictions, such as indicating that only intra coding is being used, that all layers are coded independently or that the bitstream contains only one AU; Fields constraining the bit depth and chroma format of the coded pictures; Flags indicating that certain NAL unit types are not allowed to be present within the bitstream; Flags constraining the ways that the pictures can be partitioned into slices, tiles, and subpictures within the bitstream; Flags constraining the size of CTUs, as well as the size and type of partitioning trees; Flags constraining the use of particular intra coding tools; Flags constraining the use of particular inter coding tools; Flags constraining the transform, quantization, and residual coding tools; and Flags constraining aspects of in-loop filters.

The purpose of the GCI syntax structure is to enable the simple discovery of configuration information about the features needed for decoding the bitstream and to allow the signaling of interoperability points which impose restrictions beyond those specified by the Profile, Tier, and Level (PTL), with a finer granularity than allowed by previous video coding standards. Similar to subprofiles, use of the GCI syntax structure could allow interoperability to be defined for decoder implementations that do not support all features of a VVC profile but address the needs of particular applications. Decoder implementations may examine the GCI syntax elements to check if a bitstream avoids the use of particular features, in order to determine how to configure the decoding process and identify whether the bitstream is decodable by the decoder. Decoder implementations that support all features of a VVC profile can ignore the GCI syntax element values, as such decoders will be capable of decoding any bitstream conforming to the indicated PTL.

Residual Coding for Transform Skip

According to one or more examples of the disclosure, it is proposed to use variable sets of binary codewords for coding certain syntax elements, e.g. abs_remainder, in transform skip residual coding, and the selection is determined according to certain coded information of the current block, e.g. quantization parameter or coding bit-depth associated with the TB/CB and/or the slice/profile, and/or according to a new flag associated with the TB/CB/slice/picture/sequence level, e.g. extended_precision_processing_flag. Different methods may be used to derive the variable sets of binary codewords, with some exemplar methods listed as follows.

First, the same procedure for determining the codeword for abs_remainder as used in the current VVC is used, but always with a fixed rice parameter (e.g., 2, 3, 4, 5, 6, 7 or 8) selected. The fixed value may be different in different condition according to certain coded information of the current block, e.g., quantization parameter, frame type (e.g., I, P or B), component ID (e.g., luma or chroma), color format (e.g., 420, 422 or 444) or coding bit-depth associated with the TB/CB and/or the slice/profile, and/or according to a syntax element associated with the TB/CB/slice/picture/ sequence level, e.g., rice_parameter_value. One specific example is where TH1 to TH4 are predefined thresholds satisfying (TH1<TH2<TH3 <TH4), and K0 to K4 are predefined rice parameters. It is worth noting that the same logics can be implemented differently in practice. For example, certain equations, or a look-up table, may also be used to derive the same rice parameters, from a BitDepth value of a current CU/Sequence.

Second, fixed length binarization.

Third, truncated Rice binarization.

Fourth, truncated Binary (TB) binarization process.

Fifth, k-th order Exp-Golomb binarization process (EGk).

Sixth, limited k-th order Exp-Golomb binarization

An example of the corresponding decoding process based on VVC Draft is illustrated as below, the changes to the VVC Draft are shown in Table 1 in bold and italic font, and deleted content shown in italic font. It is worth noting that the same logics can be implemented differently in practice. For example, certain equations, or a look-up table, may also be used to derive the same rice parameters.

TABLE 1

Rice parameter derivation process

The rice parameter cRiceParam is derived as follows:

- *If transform_skip_flag[ x0 ][ y0 ][ cIdx ] is equal to 1 and sh_ts_residual_coding_disabled_flag is equal to 0, the derivation process for Rice parameter cRiceParam is specified as below.*

*if(BitDepth <11)*

*{ rice parameter = 1}*

*else if(BitDepth <13)*

*{ rice parameter = 4}*

*else if(BitDepth <15)*

*{ rice parameter = 6}*

*else*

*{ rice parameter = 8}*

- Otherwise, the rice parameter cRiceParam is derived by invoking the rice parameter derivation process for abs_remainder[ ] as specified in Table 1A with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In another example, it is proposed to only use one fixed value for rice parameter in coding the syntax element of abs_remainder when the new flag, e.g., extended_precision_processing_flag, is equal to 1. The corresponding decoding process based on VVC Draft is illustrated as below, with changes in bold and italic font and deleted content shown in italic font. The changes to the VVC Draft are shown in Table 2 in bold and italic font.

TABLE 2

Rice parameter derivation process

The rice parameter cRiceParam is derived as follows:
- *If extended_precision_processing_flag is equal to 1,*
  *transform_skip_flag[ x0 ][ y0 ][ cIdx ] is equal to 1 and*
  *sh_ts_residual_coding_disabled_flag is equal to 0, the derivation process for Rice*
  *parameter cRiceParam is specified as below.*
    *if(BitDepth <11)*
    *{ rice parameter = 1}*
    *else if(BitDepth <13)*
    *{ rice parameter = 4}*
    *else if(BitDepth <15)*
    *{ rice parameter = 6}*
    *else*
    *{ rice parameter = 8}*
- If transform_skip_flag[ x0 ][ y0 ][ cIdx ] is equal to 1 and
  sh_ts_residual_coding_disabled_flag is equal to 0, the Rice parameter cRiceParam is
  set equal to 1.
- Otherwise, the rice parameter cRiceParam is derived by invoking the rice parameter
  derivation process for abs_remainder[ ] as specified in Table 1A with the variable
  baseLevel set equal to 4, the colour component index cIdx, the luma location ( x0, y0 ),
  the current coefficient scan location ( xC, yC ), the binary logarithm of the transform
  block width log2TbWidth, and the binary logarithm of the transform block height
  log2TbHeight as inputs.

In yet another example, when the new flag, e.g., extended_precision_processing_flag, is equal to 1, the Rice parameter cRiceParam is fixed as n, where n is a positive number (e.g., 2, 3, 4, 5, 6, 7 or 8). The fixed value may be different in different condition. An example of the corresponding decoding process based on VVC Draft is illustrated as below, with changes in bold and italic font and deleted content shown in italic font. The changes to the VVC Draft are shown in Table 3 in bold and italic font.

TABLE 3

Rice parameter derivation process

The rice parameter cRiceParam is derived as follows:
- *If extended_precision_processing_flag is equal to 1,*
  *transform_skip_flag[ x0 ][ y0 ][ cIdx ] is equal to 1 and*
  *sh_ts_residual_coding_disabled_flag is equal to 0, the Rice parameter cRiceParam is*
  *set equal to 7.*
- If transform_skip_flag[ x0 ][ y0 ][ cIdx ] is equal to 1 and
  sh_ts_residual_coding_disabled_flag is equal to 0, the Rice parameter cRiceParam is
  set equal to 1.
- Otherwise, the rice parameter cRiceParam is derived by invoking the rice parameter
  derivation process for abs_remainder[ ] as specified in Table 1A with the variable
  baseLevel set equal to 4, the colour component index cIdx, the luma location ( x0, y0 ),
  the current coefficient scan location ( xC, yC ), the binary logarithm of the transform
  block width log2TbWidth, and the binary logarithm of the transform block height
  log2TbHeight as inputs.

In yet another example, when BitDepth is greater than or equal to the predefined threshold (e.g., 10, 11, 12, 13, 14, 15 or 16), the Rice parameter cRiceParam is fixed as n, where n is a positive number, e.g., 4, 5, 6, 7 or 8. The fixed value may be different in different condition. An example of the corresponding decoding process based on VVC Draft is illustrated as below, where TH is a predefined threshold (e.g., 10, 11, 12, 13, 14, 15 or 16), and with changes in bold and italic font and deleted content shown in italic font. The changes to the VVC Draft are shown in Table 4 in bold and italic font.

TABLE 4

| Rice parameter derivation process |
|---|
| The rice parameter cRiceParam is derived as follows:<br>- *If BitDepth is greater than TH, transform__skip__flag[ x0 ][ y0 ][ cIdx ] is equal to 1 and sh__ts__residual__coding__disabled flag is equal to 0, the Rice parameter cRiceParam is set equal to 7.*<br>- If transform__skip__flag[ x0 ][ y0 ][ cIdx ] is equal to 1 and sh_ts_residual_coding_disabled_flag is equal to 0, the Rice parameter cRiceParam is set equal to 1.<br>- Otherwise, the rice parameter cRiceParam is derived by invoking the rice parameter derivation process for abs_remainder[ ] as specified in Table 1A with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs. |

In yet another example, one control flag is signaled in slice header to indicate whether the signaling of Rice parameter for the transform skip blocks is enabled or disabled. When the control flag is signaled as enabled, one syntax element is further signaled for each transform skip slice to indicate the Rice parameter of that slice. When the control flag is signaled as disabled (e.g., set equal to "0"), no further syntax element is signaled at lower level to indicate the Rice parameter for the transform skip slice and a default Rice parameter (e.g. 1) is used for all the transform skip slice. An example of the corresponding decoding process based on VVC Draft is illustrated as below, where TH is a predefined value (e.g. 0, 1, 2), and with changes in bold and italic font and deleted content shown in italic font. The changes to the VVC Draft are shown in Table 5 in bold and italic font. It is worth noting that the sh_ts_residual_coding_rice_index can be coded in different ways and/or may have the maximum value. For example, u(n), unsigned integer using n bits, or f(n), fixed-pattern bit string using n bits written (from left to right) with the left bit first, may also be used to encode/decode the same syntax element.

Slice Header Syntax

TABLE 5

| Syntax of residual coding | |
|---|---|
| slice_header( ) { | Descriptor |
| ... | |
| if( sps_transform_skip_enabled_flag &&<br>!sh_dep_quant_used_flag &&<br>   !sh_sign_data_hiding_used_flag ) | |
|   sh_ts_residual_coding_disabled_flag | u(1) |
| if(!sh_ts_residual_coding_disabled_flag ) { | |
|   sh_ts_residual_coding_rice_flag | u(1) |
|   if(sh_ts_residual_coding_rice_flag ) | |
|     sh_ts_residual_coding_rice_index | ue(v) |
| } | |
| ... | | sh_ts_residual_coding_rice_flag equal to 1 specifies that sh_ts_residual_coding_rice_index could be present in the current slice. sh_ts_residual_coding_rice_flag equal to 0 specifies that sh_ts_residual_coding_rice_index is not present in the current slice. When sh_ts_residual_coding_rice_flag is not present, the value of sh_ts_residual_coding_rice_flag is inferred to be equal to 0. sh_ts_residual_coding_rice_index specifies the rice parameter used for the residual_ts_coding( ) syntax structure.

TABLE 6

| Rice parameter derivation process |
| --- |
| The rice parameter cRiceParam is derived as follows:<br>- **If *sh_ts_residual_coding_rice_flag* is equal to 1,** transform_skip_flag[ x0 ][ y0 ][ cIdx ] is equal to 1 and ***sh_ts_residual_coding_disabled_flag* is equal to 0, the Rice parameter cRiceParam is** *set equal to (sh_ts_residual_coding_rice_index+TH).*<br>- If transform_skip_flag[ x0 ][ y0 ][ cIdx ] is equal to 1 and sh_ts_residual_coding_disabled_flag is equal to 0, the Rice parameter cRiceParam is set equal to 1.<br>- Otherwise, the rice parameter cRiceParam is derived by invoking the rice parameter derivation process for abs_remainder[ ] as specified in Table 1A with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs. |

In yet another example, one control flag is signaled in sequence parameter set (or in sequence parameter set range extensions syntax) to indicate whether the signaling of Rice parameter for the transform skip blocks is enabled or disabled. When the control flag is signaled as enabled, one syntax element is further signaled for each transform skip slice to indicate the Rice parameter of that slice. When the control flag is signaled as disabled (e.g., set equal to "0"), no further syntax element is signaled at lower level to indicate the Rice parameter for the transform skip slice and a default Rice parameter (e.g., 1) is used for all the transform skip slice. An example of the corresponding decoding process based on VVC Draft is illustrated as below, where TH is a predefined value (e.g., 0, 1, 2). The changes to the VVC Draft are shown in Table 7 in bold and italic font, and deleted content shown in italic font. It is worth noting that the sh_ts_residual_coding_rice_idx can be coded in different ways and/or may have the maximum value. For example, u(n), unsigned integer using n bits, or f(n), fixed-pattern bit string using n bits written (from left to right) with the left bit first, may also be used to encode/decode the same syntax element.

Sequence Parameter Set RBSP Syntax

TABLE 7

| Syntax of residual coding | |
| --- | --- |
| seq_parameter_set_rbsp( ) { | Descriptor |
| ... | |
|   sps_sign_data_hiding_enabled_flag | u(1) |
|   sps_ts_residual_coding_rice_present_in_sh_flag | u(1) |
|   sps_virtual_boundaries_enabled_flag | u(1) |
|   ... | |
| } | | sps_ts_residual_coding_rice_present_in_sh_flag equal to 1 specifies that sh_ts_residual_coding_rice_idx could be present in SH syntax structures referring to the SPS. sps_ts_residual_coding_rice_present_in_sh_flag equal to 0 specifies that sh_ts_residual_coding_rice_idx is not present in SH syntax structures referring to the SPS. When sps_ts_residual_coding_rice_present_in_sh_flag is not present, the value of sps_ts_residual_coding_rice_present_in_sh_flag is inferred to be equal to 0.

Slice Header Syntax

TABLE 8

Syntax of residual coding

| slice_header( ) { | Descriptor |
|---|---|
| ... | |
| if( sps_transform_skip_enabled_flag && | |
| !sh_dep_quant_used_flag && | |
| !sh_sign_data_hiding_used_flag ) | |
| sh_ts_residual_coding_disabled_flag | u(1) |
| if((!sh_ts_residual_coding_disabled_flag) & & | |
| sps_ts_residual_coding_rice_enabled_flag ) | |
| sh_ts_residual_coding_rice_idx | ue(v) |
| ... | |
| } | | sh_ts_residual_coding_rice_idx specifies the rice parameter used for the residual_ts_coding( ) syntax structure.

TABLE 9

Rice parameter derivation process

The rice parameter cRiceParam is derived as follows:
- *If sps_ts_residual_coding_rice_flag is equal to 1,*
  *transform_skip_flag[ x0 ][ y0 ][ cIdx ] is equal to 1 and*
  *sh_ts_residual_coding_disabled_flag is equal to 0, the Rice parameter cRiceParam is*
  *set equal to (sh_ts_residual_coding_rice_ idx+TH).*
- If transform_skip_flag[ x0 ][ y0 ][ cIdx ] is equal to 1 and
  sh_ts_residual_coding_disabled_flag is equal to 0, the Rice parameter cRiceParam is
  set equal to 1.
- Otherwise, the rice parameter cRiceParam is derived by invoking the rice parameter
  derivation process for abs_remainder[ ] as specified in Table 1A with the variable
  baseLevel set equal to 4, the colour component index cIdx, the luma location ( x0, y0 ),
  the current coefficient scan location ( xC, yC ), the binary logarithm of the transform
  block width log2TbWidth, and the binary logarithm of the transform block height
  log2TbHeight as inputs.

In one or more examples of the disclosure, it is proposed to disable the presence of Rice parameter for transform skip residual coding if transform skip is disabled. In one specific example, to fulfill such design purpose, it is proposed to use sps_transform_skip_enabled_flag to condition the presence of sps_ts_residual_coding_rice_present_in_sh_flag. For example, when the flag sps_transform_skip_enabled_flag is equal to zero (i.e., the transform skip is disabled at current picture), sps_ts_residual_coding_rice_present_in_sh_flag is not signaled but inferred to be 0. When the flag sps_transform_skip_enabled_flag is equal to one, the sps_ts_residual_coding_rice_present_in_sh_flag is further signaled. The change to current VVC working draft is shown in italic font below.

| if( sps_transform_skip_enabled_flag ) | |
|---|---|
| sps_ts_residual_coding_rice_present_in_sh_flag | u(1) |

In another specific example, to fulfill such design purpose, it is proposed to add a requirement of bitstream conformance related to sps_transform_skip_enabled_flag for sps_ts_residual_coding_rice_present_in_sh_flag. For example, It is a requirement of bitstream conformance that the value of sps_ts_residual_coding_rice_present_in_sh_flag shall be equal to 0 when sps_transform_skip_enabled_flag is equal to 0. The change to current VVC working draft is shown in italic font below.

Sequence parameter set range extension semantics sps_ts_residual_coding_rice_present_in_sh_flag equal to 1 specifies that sh_ts_residual_coding_rice_idx_minus1 may be present in slice_header( ) syntax structures referring to the SPS. sps_ts_residual_coding_rice_present_in_sh_flag equal to 0 specifies that sh_ts_residual_coding_rice_idx_minus1 is not present in slice_header( ) syntax structures referring to the SPS. When sps_ts_residual_coding_rice_present_in_sh_flag is not present, the value of sps_ts_residual_coding_rice_present_in_sh_flag is inferred to be equal to 0.

It is a requirement of bitstream conformance that the value of sps_ts_residual_coding_rice_present_in_sh_flag shall be equal to 0 when sps_transform_skip_enabled_flag is equal to 0.

In yet another example, when the flag of transform skip (sps_transform_skip_enabled_flag) is signaled as enabled, one control flag is further signaled in sequence parameter set (or in sequence parameter set range extensions syntax) to indicate whether the signaling of Rice parameter for the transform skip blocks is enabled or disabled. When the control flag is signaled as enabled, one syntax element is further signaled for each transform skip slice to indicate the Rice parameter of that slice. When the control flag is signaled as disabled (e.g. set equal to "0"), no further syntax element is signaled at lower level to indicate the Rice parameter for the transform skip slice and a default Rice parameter (e.g. 1) is used for all the transform skip slice. An example of the corresponding decoding process based on VVC Draft is illustrated as below. The changes to the VVC Draft are shown in italic font.

Sequence Parameter Set RBSP Syntax

| seq_parameter_set_rbsp( ) { | Descriptor |
|---|---|
| ... | |
| sps_sign_data_hiding_enabled_flag | u(1) |
| if( sps_transform_skip_enabled_flag ) | |
| sps_ts_residual_coding_rice present_in_sh_flag | u(1) |

-continued

| seq_parameter_set_rbsp( ) { | Descriptor |
|---|---|
| sps_virtual_boundaries_enabled_flag | u(1) |
| ... | |
| } | | sps_ts_residual_coding_rice_present_in_sh_flag equal to 1 specifies that sh_ts_residual_coding_rice_idx could be present in SH syntax structures referring to the SPS. sps_ts_residual_coding_rice_present_in_sh_flag equal to 0 specifies that sh_ts_residual_coding_rice_idx_minus1 is not present in SH syntax structures referring to the SPS. When sps_ts_residual_coding_rice_present_in_sh_flag is not present, the value of sps_ts_residual_coding_rice_present_in_sh_flag is inferred to be equal to 0.

Slice Header Syntax

| slice_header( ) { | Descriptor |
|---|---|
| ... | |
| if( sps_transform_skip_enabled_flag && | |
| !sh_dep_quant_used_flag && | |
| !sh_sign_data_hiding_used_flag ) | |
| sh_ts_residual_coding_disabled_flag | u(1) |
| if((!sh_ts residual_coding_disabled_flag) && | |
| sps_ts_residual_coding_rice_present_in_sh_flag ) | |
| sh_ts_residual_coding_rice_idx_minus1 | u(3) |
| ... | |
| } | | sh_ts_residual_coding_rice_idx_minus1 plus 1, specifies the rice parameter used for the residual_ts_coding( ) syntax structure. When sh_ts_residual_coding_rice_idx_minus1 is not present, the value of sh_ts_residual_coding_rice_idx_minus1 is inferred to be equal to 0.

9.3.3.11 Binarization Process for Abs_Remainder[ ]

Input to this process is a request for a binarization for the syntax element abs_remainder[n], the colour component cIdx, the current sub-block index i, and the luma location (x0, y0) specifying the top-left sample of the current luma transform block relative to the top-left luma sample of the picture, the current coefficient scan location (xC, yC), the binary logarithm of the transform block width log 2TbWidth, and the binary logarithm of the transform block height log 2TbHeight.

Output of this process is the binarization of the syntax element.

The variables lastAbsRemainder and lastRiceParam are derived as follows:

If this process is invoked for the first time for the current sub-block index i, lastAbsRemainder and lastRiceParam are both set equal to 0.

Otherwise (this process is not invoked for the first time for the current sub-block index i), lastAbsRemainder and lastRiceParam are set equal to the values of abs_remainder[n] and cRiceParam, respectively, that have been derived during the last invocation of the binarization process for the syntax element abs_remainder[n] as specified in this clause.

The rice parameter cRiceParam is derived as follows:

If transform_skip_flag[x0][y0][cIdx] is equal to 1 and sh_ts_residual_coding_disabled_flag is equal to 0, the Rice parameter cRiceParam is set equal to sh_ts_residual_coding_rice_idx_minus1+1.

Otherwise, the rice parameter cRiceParam is derived by invoking the rice parameter derivation process for abs_remainder[ ] as specified in clause 9.3.3.2 with the variable baseLevel set equal to 4, the colour component index cIdx, the luma location (x0, y0), the current coefficient scan location (xC, yC), the binary logarithm of the transform block width log 2TbWidth, and the binary logarithm of the transform block height log 2TbHeight as inputs.

In yet another example, one syntax element is signaled for each transform skip slice to indicate the Rice parameter of that slice. An example of the corresponding decoding process based on VVC Draft is illustrated as below. The changes to the VVC Draft are shown in Table 10 in bold and italic font. It is worth noting that the sh_ts_residual_coding_rice_idx can be coded in different ways and/or may have the maximum value. For example, u(n), unsigned integer using n bits, or f(n), fixed-pattern bit string using n bits written (from left to right) with the left bit first, may also be used to encode/decode the same syntax element.

Slice Header Syntax

TABLE 10

| Syntax of residual coding | |
|---|---|
| slice_header( ) { | Descriptor |
| ... | |
| if( sps_transform_skip_enabled_flag && | |
| !sh_dep_quant_used_flag && | |
| !sh_sign_data_hiding_used_flag ) | |
| sh_ts_residual_coding_disabled_flag | u(1) |
| if(!sh_ts_residual_coding_disabled_flag) | |
| sh_ts_residual_coding_rice_idx | ue(v) |
| ... | |
| } | | sh_ts_residual_coding_rice_idx specifies the rice parameter used for the residual_ts_coding( ) syntax structure. When sh_ts_residual_coding_rice_idx is not present, the value of sh_ts_residual_coding_rice_idx is inferred to be equal to 0.

TABLE 11

| Rice parameter derivation process |
|---|
| The rice parameter cRiceParam is derived as follows: |
| - If transform_skip_flag[ x0 ][ y0 ][ cIdx ] is equal to 1 and sh_ts_residual_coding_disabled_flag is equal to 0, the Rice parameter cRiceParam is set equal to *sh_ts_residual_coding_rice_idx*+1. |
| - Otherwise, the rice parameter cRiceParam is derived by invoking the rice parameter derivation process for abs_remainder[ ] as specified in Table 1A with the variable baseLevel set equal to 4, the colour component index cIdx, the luma location ( x0, y0 ), the current coefficient scan location ( xC, yC ), the binary logarithm of the transform block width log2Tb Width, and the binary logarithm of the transform block height log2TbHeight as inputs. |

In yet another example, one control flag is signaled in picture parameter set range extensions syntax to indicate whether the signaling of Rice parameter for the transform skip blocks is enabled or disabled. When the control flag is signaled as enabled, one syntax element is further signaled to indicate the Rice parameter of that picture. When the control flag is signaled as disabled (e.g., set equal to "0"), no further syntax element is signaled at lower level to indicate the Rice parameter for the transform skip slice and a default Rice parameter (e.g., 1) is used for all the transform skip slice. An example of the corresponding decoding process based on VVC Draft is illustrated as below, where TH is a predefined value (e.g., 0, 1, 2). The changes to the VVC Draft are shown in Table 12 in bold and italic font. It is worth noting that the pps_ts_residual_coding_rice_idx can be coded in different ways and/or may have the maximum value. For example, u(n), unsigned integer using n bits, or f(n), fixed-pattern bit string using n bits written (from left to right) with the left bit first, may also be used to encode/decode the same syntax element.

Picture Parameter Set Range Extensions Syntax

TABLE 12

| Syntax of residual coding | |
| --- | --- |
| pps_range_extensions( ) { | Descriptor |
| ... | |
| pps_ts_residual_coding_rice_flag | u(1) |
| if(pps_ts_residual_coding_rice_flag ) | |
| pps_ts_residual_coding_rice_idx | ue(v) |
| } | |
| ... | | pps_ts_residual_coding_rice_flag equal to 1 specifies that pps_ts_residual_coding_rice_index could be present in the current picture. pps_ts_residual_coding_rice_flag equal to 0 specifies that pps_ts_residual_coding_rice_idx is not present in the current picture. When pps_ts_residual_coding_rice_flag is not present, the value of pps_ts_residual_coding_rice_flag is inferred to be equal to 0.

pps_ts_residual_coding_rice_idx specifies the rice parameter used for the residual_ts_coding( ) syntax structure.

TABLE 13

| Rice parameter derivation process |
| --- |

The rice parameter cRiceParam is derived as follows:

- *If pps_ts_residual_coding_rice_flag is equal to 1, transform_skip_flag[ x0 ][ y0 ][ cIdx ] is equal to 1 and sh_ts_residual_coding_disabled_flag is equal to 0, the Rice parameter cRiceParam is set equal to (pps_ts_residual_coding_rice_idx+TH).*

- If transform_skip_flag[ x0 ][ y0 ][ cIdx ] is equal to 1 and sh_ts_residual_coding_disabled_flag is equal to 0, the Rice parameter cRiceParam is set equal to 1.

- Otherwise, the rice parameter cRiceParam is derived by invoking the rice parameter derivation process for abs_remainder[ ] as specified in Table 1A with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In yet another example, it is proposed to only use a varying rice parameter for the coding of the syntax element abs_remainder. The value of the applied rice parameter may be determined according to certain coded information of the current block, e.g., block size, quantization parameter, bit depth, the transform types and so forth. In one specific embodiment, it is proposed to adjust the rice parameter based on the coding bit-depth and the quantization parameter that is applied to one CU. The corresponding decoding process based on VVC Draft is illustrated as below, the changes to the VVC Draft are shown in Table 14 in bold and italic font, and deleted content shown in italic font. It is worth noting that the same logics can be implemented differently in practice. For example, certain equations, or a look-up table, may also be used to derive the same rice parameters.

TABLE 14

Rice parameter derivation process

The rice parameter cRiceParam is derived as follows:

- If transform_skip_flag[ x0 ][ y0 ][ cIdx ] is equal to 1 and sh_ts_residual_coding_disabled_flag is equal to 0, the derivation process for Rice parameter cRiceParam is specified as below.

if(BitDepth <11)

{rice parameter = 1} else if(BitDepth <13)

{if(QP$_{CU}$ <−15) { rice parameter = 6} else if(QP$_{CU}$ <−10)

{ rice parameter = 5} else if(QP$_{CU}$ <0)

{ rice parameter = 4} else if(QP$_{CU}$ <10)

{ rice parameter = 3} else

{ rice parameter = 2}} else if(BitDepth <15)

{if(QP$_{CU}$ <−25) { rice parameter = 7} else if(QP$_{CU}$ <−15)

{ rice parameter = 6} else if(QP$_{CU}$ <−10)

{ rice parameter = 5} else

{ rice parameter = 4}} else

{ if(QP$_{CU}$<−30) { rice parameter = 8} else if(QP$_{CU}$<−25)

{ rice parameter = 7} else if(QP$_{CU}$<−15)

{ rice parameter = 6} else if(QP$_{CU}$<−10)

{ rice parameter = 5} else rice parameter = 4}}

- Otherwise, the rice parameter cRiceParam is derived by invoking the rice parameter derivation process for abs_remainder[ ] as specified in Table 1A with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In yet another example, the corresponding decoding process based on VVC Draft is illustrated as below, where TH is a predefined threshold (e.g., 33 or 34). The changes to the VVC Draft are shown in Table 15 in bold and italic font, and deleted content shown in italic font. It is worth noting that the same logics can be implemented differently in practice. For example, certain equations, or a look-up table, may also be used to derive the same rice parameters.

TABLE 15

Rice parameter derivation process

The rice parameter cRiceParam is derived as follows:
- *If transform_skip_flag[ x0 ][ y0 ][ cIdx ] is equal to 1 and sh_ts_residual_coding_disabled_flag is equal to 0, the derivation process for Rice parameter cRiceParam is specified as below.*
     *rice parameter = Clip3( 1, 8, Floor( (TH − BitDepth −$QP_{CU}$)/6 ) )*
- Otherwise, the rice parameter cRiceParam is derived by invoking the rice parameter derivation process for abs_remainder[ ] as specified in Table 1A with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In yet another example, the corresponding decoding process based on VVC Draft is illustrated as below, where $TH_A$ and $TH_B$ are predefined thresholds (e.g., $TH_A$=8, $TH_B$=33 or 34). The changes to the VVC Draft are shown in Table 16 in bold and italic font, and deleted content shown in italic font. It is worth noting that the same logics can be implemented differently in practice. For example, certain equations, or a look-up table, may also be used to derive the same rice parameters.

TABLE 16

Rice parameter derivation process

The rice parameter cRiceParam is derived as follows:
- *If transform_skip_flag[ x0 ][ y0 ][ cIdx ] is equal to 1 and sh_ts_residual_coding_disabled_flag is equal to 0, the derivation process for Rice parameter cRiceParam is specified as below.*
     *rice parameter = Clip3( 1, BitDepth − $TH_A$, Floor( ($TH_B$ − BitDepth − $QP_{CU}$)/6 ) )*
- Otherwise, the rice parameter cRiceParam is derived by invoking the rice parameter derivation process for abs_remainder[ ] as specified in Table 1A with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In yet another example, it is proposed to only use a varying rice parameter for the coding of the syntax element of abs_remainder when the new flag, e.g., extended_precision_processing_flag, is equal to 1. The varying value may be determined according to certain coded information of the current block, e.g., block size, quantization parameter, bit depth, the transform types and so forth. In one specific embodiment, it is proposed to adjust the rice parameter based on the coding bit-depth and the quantization parameter that is applied to one CU. The corresponding decoding process based on VVC Draft is illustrated as below. The changes to the VVC Draft are shown in Table 17 in bold and italic font. It is worth noting that the same logics can be implemented differently in practice. For example, certain equations, or a look-up table, may also be used to derive the same rice parameters.

TABLE 17

---

Rice parameter derivation process

---

The rice parameter cRiceParam is derived as follows:
- *If extended_precision_processing_flag is equal to 1,*
  *transform_skip_flag[ x0 ][ y0 ][ cIdx ] is equal to 1 and*
  *sh_ts_residual_coding_disabled_flag is equal to 0, the derivation process for Rice*
  *parameter cRiceParam is specified as below.*

*if($QP_{CU}$ <−30)*
      *{ rice parameter = 8}*
      *else if($QP_{CU}$ <−25)*
      *{ rice parameter = 7}*
      *else if($QP_{CU}$ <−15)*
      *{ rice parameter = 6}*
      *else if($QP_{CU}$ <−10)*
      *{ rice parameter = 5}*
      *else if($QP_{CU}$ <0)*
      *{ rice parameter = 4}*
    *else if($QP_{CU}$ <10)*
    *{ rice parameter = 3}*
    *else if($QP_{CU}$ <15)*
    *{ rice parameter = 2}*
    *else*
    *{ rice parameter = 1}*

- If transform_skip_flag[ x0 ][ y0 ][ cIdx ] is equal to 1 and
  sh_ts_residual_coding_disabled_flag is equal to 0, the Rice parameter cRiceParam is
  set equal to 1.
- Otherwise, the rice parameter cRiceParam is derived by invoking the rice parameter
  derivation process for abs_remainder[ ] as specified in Table 1A with the variable
  baseLevel set equal to 4, the colour component index cIdx, the luma location ( x0, y0 ),
  the current coefficient scan location ( xC, yC ), the binary logarithm of the transform
  block width log2TbWidth, and the binary logarithm of the transform block height
  log2TbHeight as inputs.

---

In yet another example, the corresponding decoding process based on VVC Draft is illustrated as below, where TH is a predefined threshold (e.g., 18, 19). The changes to the VVC Draft are shown in Table 18 in bold and italic font. It is worth noting that the same logics can be implemented differently in practice. For example, certain equations, or a look-up table, may also be used to derive the same rice parameters.

TABLE 18

---

Rice parameter derivation process

---

The rice parameter cRiceParam is derived as follows:
- *If extended_precision_processing_flag is equal to 1,*
  *transform_skip_flag[ x0 ][ y0 ][ cIdx ] is equal to 1 and*
  *sh_ts_residual_coding_disabled_flag is equal to 0, the derivation process for Rice*
  *parameter cRiceParam is specified as below.*

*rice parameter = Clip3( 1, 8, (TH − QP)/6 )*

- If transform_skip_flag[ x0 ][ y0 ][ cIdx ] is equal to 1 and
  sh_ts_residual_coding_disabled_flag is equal to 0, the Rice parameter cRiceParam is
  set equal to 1.
- Otherwise, the rice parameter cRiceParam is derived by invoking the rice parameter
  derivation process for abs_remainder[ ] as specified in Table 1A with the variable
  baseLevel set equal to 4, the colour component index cIdx, the luma location ( x0, y0 ),
  the current coefficient scan location ( xC, yC ), the binary logarithm of the transform
  block width log2TbWidth, and the binary logarithm of the transform block height
  log2TbHeight as inputs.

---

In yet another example, the corresponding decoding process based on VVC Draft is illustrated as below, where $TH_A$ and $TH_B$ are predefined thresholds (e.g., $TH_A$=8, $TH_B$=18 or 19). The changes to the VVC Draft are shown in Table 19 in bold and italic font. It is worth noting that the same logics can be implemented differently in practice. For example, certain equations, or a look-up table, may also be used to derive the same rice parameters.

TABLE 19

Rice parameter derivation process

The rice parameter cRiceParam is derived as follows:
- *If extended_precision_processing_flag is equal to 1, transform_skip_flag[ x0 ][ y0 ][ cIdx ] is equal to 1 and sh_ts_residual_coding_disabled_flag is equal to 0, the derivation process for Rice parameter cRiceParam is specified as below.*
  *rice parameter = Clip3( 1, BitDepth − TH$_A$, (TH$_B$ − QP)/6)*
- If transform_skip_flag[ x0 ][ y0 ][ cIdx ] is equal to 1 and sh_ts_residual_coding_disabled_flag is equal to 0, the Rice parameter cRiceParam is set equal to 1.
- Otherwise, the rice parameter cRiceParam is derived by invoking the rice parameter derivation process for abs_remainder[ ] as specified in Table 1A with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

Figure 6:
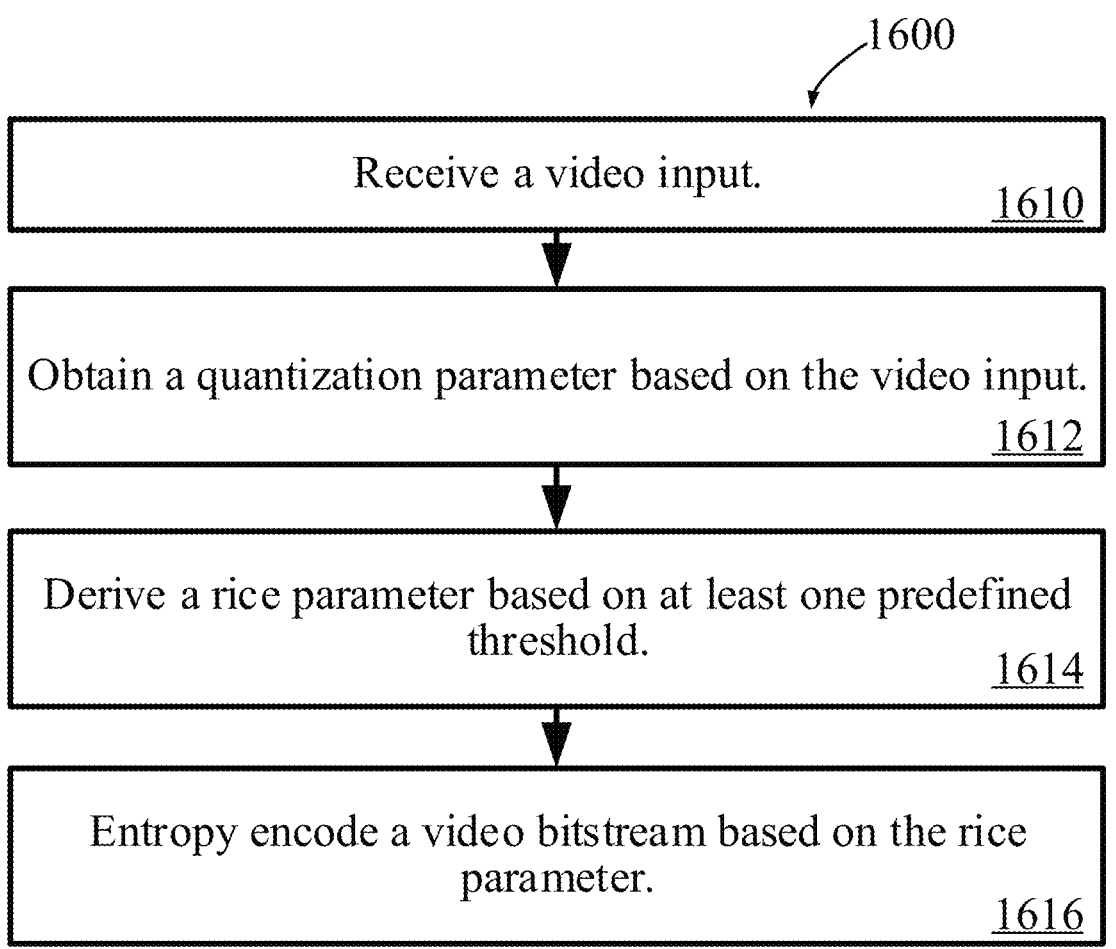
FIG. 6 is a method for encoding a video signal, according to an example of the present disclosure.

FIG. 6 shows a method for video encoding. The method may be, for example, applied to an encoder. In step 1610, the encoder may receive a video input. The video input, for example, may be a live stream. In step 1612, the encoder may obtain a quantization parameter based on the video input. The quantization parameter, for example, may be calculated by the quantization unit in the encoder. In step 1614, the encoder may derive a rice parameter based on at least one predefined threshold, a coding bit-depth, and the quantization parameter. The rice parameter, for example, is used for signaling the syntax of abs_remainder and dec_abs_level. In step 1616 the encoder may entropy encode a video bitstream based on the rice parameter. The video bitstream, for example, may be entropy encode to generate a compressed video bitstream.

In yet another example, it is proposed to only use a fixed value (e.g., 2, 3, 4, 5, 6, 7 or 8) for rice parameter in coding the syntax element of abs_remainder when BitDepth is greater than 10. The fixed value may be different in different condition according to certain coded information of the current block, e.g., quantization parameter. The corresponding decoding process based on VVC Draft is illustrated as below, where TH is a predefined threshold (e.g., 18, 19). The changes to the VVC Draft are shown in Table 20 in bold and italic font. It is worth noting that the same logics can be implemented differently in practice. For example, certain equations, or a look-up table, may also be used to derive the same rice parameters.

TABLE 20

Rice parameter derivation process

The rice parameter cRiceParam is derived as follows:
- *If BitDepth is greater than 10, transform_skip_flag[ x0 ][ y0 ][ cIdx ] is equal to 1 and sh_ts_residual_coding_disabled_flag is equal to 0, the derivation process for Rice parameter cRiceParam is specified as below.*
  *rice parameter = Clip3( 1, 8, (TH − QP)/6 )*

TABLE 20-continued

Rice parameter derivation process

- If transform_skip_flag[ x0 ][ y0 ][ cIdx ] is equal to 1 and sh_ts_residual_coding_disabled_flag is equal to 0, the Rice parameter cRiceParam is set equal to 1.
- Otherwise, the rice parameter cRiceParam is derived by invoking the rice parameter derivation process for abs_remainder[ ] as specified in TABLE 20-continued Rice parameter derivation process Table 1A with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In yet another example, the corresponding decoding process based on VVC Draft is illustrated as below, where $TH_A$ and $TH_B$ are predefined thresholds (e.g., $TH_A$=8, $TH_B$=18 or 19). The changes to the VVC Draft are shown in Table 21 in bold and italic font. It is worth noting that the same logics can be implemented differently in practice. For example, certain equations, or a look-up table, may also be used to derive the same rice parameters.

TABLE 21

Rice parameter derivation process

The rice parameter cRiceParam is derived as follows:
- *If BitDepth is greater than 10, transform_skip_flag[ x0 ][ y0 ][ cIdx ] is equal to 1 and sh_ts_residual_coding_disabled_flag is equal to 0, the derivation process for Rice parameter cRiceParam is specified as below.*
  *rice parameter = Clip3( 1, BitDepth − TH$_A$, (TH$_B$ − QP)/6 )*
- If transform_skip_flag[ x0 ][ y0 ][ cIdx ] is equal to 1 and sh_ts_residual_coding_disabled_flag is equal to 0, the Rice parameter cRiceParam is set equal to 1.
- Otherwise, the rice parameter cRiceParam is derived by invoking the rice parameter derivation process for abs_remainder[ ] as specified in Table 1A with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In yet another example, the corresponding decoding process based on VVC Draft is illustrated as below, where TH is a predefined threshold (e.g., 33 or 34). the changes to the VVC Draft are shown in Table 22 in bold and italic font. It is worth noting that the same logics can be implemented differently in practice. For example, certain equations, or a look-up table, may also be used to derive the same rice parameters.

TABLE 22

Rice parameter derivation process

The rice parameter cRiceParam is derived as follows:
- *If BitDepth is greater than 10, transform_skip_flag[ x0 ][ y0 ][ cIdx ]*
  *is equal to 1 and sh_ts_residual_coding_disabled_flag is equal to 0,*
  *the derivation process for Rice parameter cRiceParam is specified as below.*
      *rice parameter = Clip3( 1, 8, (TH − BitDepth −QP_{CU})/6 )*
- If transform_skip_flag[ x0 ][ y0 ][ cIdx ] is equal to 1 and sh_ts_residual_coding_disabled_flag is equal to 0, the Rice parameter cRiceParam is set equal to 1.
- Otherwise, the rice parameter cRiceParam is derived by invoking the rice parameter derivation process for abs_remainder[ ] as specified in Table 1A with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In yet another example, the corresponding decoding process based on VVC Draft is illustrated as below, where $TH_A$ and $TH_B$ are predefined thresholds (e.g., $TH_A$=8, $TH_B$=33 or 34). The changes to the VVC Draft are shown in Table 23 in bold and italic font. It is worth noting that the same logics can be implemented differently in practice. For example, certain equations, or a look-up table, may also be used to derive the same rice parameters.

TABLE 23

Rice parameter derivation process

The rice parameter cRiceParam is derived as follows:
- *If BitDepth is greater than 10, transform_skip_flag[ x0 ][ y0 ][ cIdx ]*
  *is equal to 1 and sh_ts_residual_coding_disabled_flag is equal to 0,*
  *the derivation process for Rice parameter cRiceParam is specified as below.*
      *rice parameter = Clip3( 1, BitDepth − $TH_A$,($TH_B$ − BitDepth −QP_{CU})/6 )*
- If transform_skip_flag[ x0 ][ y0 ][ cIdx ] is equal to 1 and sh_ts_residual_coding_disabled_flag is equal to 0, the Rice parameter cRiceParam is set equal to 1.
- Otherwise, the rice parameter cRiceParam is derived by invoking the rice parameter derivation process for abs_remainder[ ] as specified in Table 1A with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

It is worthy to be mentioned that in the above illustrations, the equations used for calculating the specific rice parameters are only used as examples to illustrate the proposed ideas. To a person skilled in the modern video coding techniques, other mapping functions (or equivalently mapping equations) are already applicable to the proposed idea (i.e., determining the rice parameter of the transform skip mode based on coding bit and applied quantization parameter). Meanwhile, it should be also mentioned that in the current VVC design, the value of the applied quantization parameter is allowed to change at coding block group level. Therefore, the proposed rice parameter adjustment scheme can provide flexible adaptation of the rice parameters of the transform skip mode at coding block group level.

Signaling Information for Regular Residual Coding and Transform Skip Residual Coding According to one or more examples of the disclosure, it is proposed to signal a rice parameter of binary codewords for coding certain syntax elements, e.g. abs_remainder in transform skip residual coding, shift and offset parameters for derivation of the rice parameter used for abs_remainder/dec_abs_level in regular residual coding, and determine whether to signal according to certain coded information of the current block, e.g. quantization parameter or coding bit-depth associated with the TB/CB and/or the slice/profile, and/or according to a new flag associated with the TB/CB/slice/picture/sequence level, e.g. sps_residual_coding_info_present_in_sh_flag.

In one example, one control flag is signaled in slice header to indicate whether the signaling of Rice parameter for the transform skip blocks and the signaling of shift and/or offset parameters for derivation of the rice parameter in the transform blocks are enabled or disabled. When the control flag is signaled as enabled, one syntax element is further signaled for each transform skip slice to indicate the Rice parameter of that slice and two syntax elements are further signaled for each transform slice to indicate the shift and/or offset parameters for derivation of Rice parameter of that slice. When the control flag is signaled as disabled (e.g. set equal to "0"), no further syntax element is signaled at lower level to indicate the Rice parameter for the transform skip slice and a default Rice parameter (e.g. 1) is used for all the transform skip slice and no further syntax element is signaled at lower level to indicate the shift and offset parameters for derivation of Rice parameter for the transform slice and default shift and/or offset parameters (e.g. 0) is used for all the transform slice. An example of the corresponding decoding process based on VVC Draft is illustrated as below, where TH is a predefined value (e.g., 0, 1, 2). The changes to the VVC Draft are shown in Table 24 in bold and italic font. It is worth noting that the sh_residual_coding_rice_shift, sh_residual_coding_rice_offset, and sh_ts_residual_coding_rice_index can be coded in different ways and/or may have the maximum value. For example, u(n), unsigned integer using n bits, or f(n), fixed-pattern bit string using n bits written (from left to right) with the left bit first, may also be used to encode/decode the same syntax element.

Figure 7:
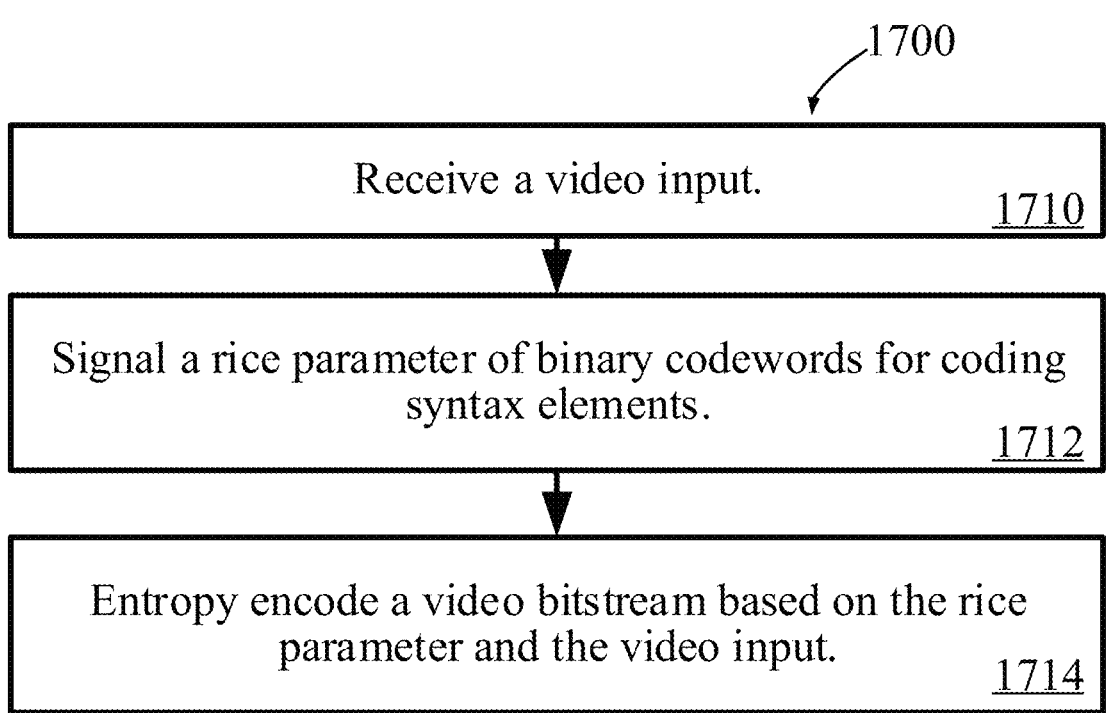
FIG. 7 is a method for encoding a video signal, according to an example of the present disclosure.

FIG. 7 shows a method for video decoding. The method may be, for example, applied to an encoder. In step 1710, the encoder may receive a video input. In step 1712, the encoder may signal a rice parameter of binary codewords for coding syntax elements. The coding syntax elements may include abs_remainder in transform skip residual coding. In step 1714, the encoder may entropy encode a video bitstream based on the rice parameter and the video input.

Slice Header Syntax

TABLE 24

Syntax of residual coding

| slice_header( ) { | Descriptor |
| --- | --- |
| ... | |
| if( sps_transform_skip_enabled_flag && | |
| !sh_dep_quant_used_flag && | |
| !sh_sign_data_hiding_used_flag ) | |
| sh_ts_residual_coding_disabled_flag | u(1) |
| sh_residual_coding_rice_flag | u(1) |
| if(sh_ts_residual_coding_rice_flag) { | |

TABLE 24-continued

Syntax of residual coding

| slice_header( ) { | Descriptor |
|---|---|
|     sh_residual_coding_rice_shift | ue(v) |
|     sh_residual_coding_rice_offset | ue(v) |
|     if(!sh_ts_residual_coding_disabled_flag) | |
|         sh_ts_residual_coding_rice_index | ue(v) |
|     } | |
|     ... | | sh_residual_coding_rice_flag equal to 1 specifies that sh_residual_coding_rice_shift, sh_residual_coding_rice_offset, and sh_residual_coding_rice_index could be present in the current slice. sh_residual_coding_rice_flag equal to 0 specifies that sh_residual_coding_rice_shift, sh_residual_coding_rice_offset, and sh_residual_coding_rice_index are not present in the current slice.

sh_residual_coding_rice_shift specifies the shift parameter used for the Rice parameter derivation process for abs_remainder[ ] and dec_abs_level[ ]. When sh_residual_coding_rice_shift is not present, the value of sh_residual_coding_rice_shift is inferred to be equal to 0.

sh_residual_coding_rice_offset specifies the offset parameter used for the Rice parameter derivation process for abs_remainder[ ] and dec_abs_level[ ]. When sh_residual_coding_rice_offset is not present, the value of sh_residual_coding_rice_offset is inferred to be equal to 0.

sh_ts_residual_coding_rice_index specifies the rice parameter used for the residual_ts_coding( ) syntax structure. When sh_ts_residual_coding_rice_index is not present, the value of sh_ts_residual_coding_rice_index is inferred to be equal to 0.

TABLE 25

Rice parameter derivation process

Binarization process for abs_remainder[ ]

. . .

The rice parameter cRiceParam is derived as follows:
- *If sh_residual_coding_rice_flag is equal to 1, transform_skip_flag[ x0 ][ y0 ][ cIdx ] is equal to 1 and sh_ts_residual_coding_disabled_flag is equal to 0, the Rice parameter cRiceParam is set equal to (sh_ts_residual_coding_rice_index+TH).*
- If transform_skip_flag[ x0 ][ y0 ][ cIdx ] is equal to 1 and sh_ts_residual_coding_disabled_flag is equal to 0, the Rice parameter cRiceParam is set equal to 1.
- Otherwise, the rice parameter cRiceParam is derived by invoking the rice parameter derivation process for abs_remainder[ ] as specified in Table 1A with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

. . .

TABLE 26

Rice parameter derivation process

Rice parameter derivation process for abs_remainder[ ] and dec_abs_level[ ]

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, the binary logarithm of the transform block height log2TbHeight, *sh_residual_coding_rice_shift, and sh_residual_coding_rice_offset.*

TABLE 26-continued

Rice parameter derivation process

Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:

locSumAbs = 0
   if( xC < (1 << log2TbWidth) − 1 ) {
      locSumAbs += AbsLevel[ xC + 1 ][ yC ]
      if( xC < (1 << log2TbWidth) − 2 )
         locSumAbs += AbsLevel[ xC + 2 ][ yC ]
      if( yC < (1 << log2TbHeight) − 1 )
         locSumAbs += AbsLevel[ xC + 1 ][ yC + 1 ]          (1494)
   }
   if( yC < (1 << log2TbHeight) − 1 ) {
      locSumAbs += AbsLevel[ xC ][ yC + 1 ]
      if( yC < (1 << log2TbHeight) − 2 )
         locSumAbs += AbsLevel[ xC ][ yC + 2 ]
   }
   locSumAbs = Clip3( 0, 31, ( (locSumAbs+
   *sh_residual_coding_rice_offset)>> sh_residual_coding_rice_shift*)
   − baseLevel * 5 )
Given the variable locSumAbs, the Rice parameter cRiceParam is derived specified in Table 1B.
*cRiceParam = cRiceParam+ sh_residual_coding_rice_shift*
When baseLevel is equal to 0, the variable ZeroPos[ n ] is derived as follows:
ZeroPos[ n ] = ( QState < 2 ? 1 : 2 ) << cRiceParam In another example, one control flag is signaled in sequence parameter set (or in sequence parameter set range extensions syntax) to indicate whether the signaling of Rice parameter for the transform skip blocks and the signaling of shift and/or offset parameters for derivation of the rice parameter in the transform blocks are enabled or disabled. When the control flag is signaled as enabled, one syntax element is further signaled for each transform skip slice to indicate the Rice parameter of that slice and two syntax elements are further signaled for each transform slice to indicate the shift and/or offset parameters for derivation of Rice parameter of that slice. When the control flag is signaled as disabled (e.g. set equal to "0"), no further syntax element is signaled at lower level to indicate the Rice parameter for the transform skip slice and a default Rice parameter (e.g. 1) is used for all the transform skip slice and no further syntax element is signaled at lower level to indicate the shift and/or offset parameters for derivation of Rice parameter for the transform slice and default shift and/or offset parameters (e.g. 0) is used for all the transform slice. An example of the corresponding decoding process based on VVC Draft is illustrated as below, where TH is a predefined value (e.g., 0, 1, 2). The changes to the VVC Draft are shown in Table 27 in bold and italic font. It is worth noting that the sh_residual_coding_rice_shift, sh_residual_coding_rice_offset, and sh_ts_residual_coding_rice_idx can be coded in different ways and/or may have the maximum value. For example, u(n), unsigned integer using n bits, or f(n), fixed-pattern bit string using n bits written (from left to right) with the left bit first, may also be used to encode/decode the same syntax element.

Sequence Parameter Set RBSP Syntax

TABLE 27

| Syntax of residual coding | |
| --- | --- |
| seq_parameter_set_rbsp( ) { | Descriptor |
| ... | |
|     sps_sign_data_hiding_enabled_flag | u(1) |
|     sps_residual_coding_info_present_in_sh_flag | u(1) |
|     sps_virtual_boundaries_enabled_flag | u(1) |
|     ... | |
| } | | sps_residual_coding_info_present_in_sh_flag equal to 1 specifies that sh_residual_coding_rice_shift, sh_residual_coding_rice_offset, and sh_ts_residual_coding_rice_idx could be present in SH syntax structures referring to the SPS. sps_residual_coding_info_present_in_sh_flag equal to 0 specifies that sh_residual_coding_rice_shift, sh_residual_coding_rice_offset, and sh_ts_residual_coding_rice_idx are not present in SH syntax structures referring to the SPS. When sps_residual_coding_info_present_in_sh_flag is not present, the value of sps_residual_coding_info_present_in_sh_flag is inferred to be equal to 0.

Slice Header Syntax

TABLE 28

| Syntax of residual coding | |
| --- | --- |
| slice_header( ) { | Descriptor |
| ... | |
|   if( sps_transform_skip_enabled_flag && | |
|   !sh_dep_quant_used_flag && | |
|     !sh_sign_data_hiding_used_flag ) | |
|     sh_ts_residual_coding_disabled_flag | u(1) |
|   if(sps_ts_residual_coding_rice_enabled_flag ) { | |
|     sh_residual_coding_rice_shift | ue(v) |
|     sh_residual_coding_rice_offset | ue(v) |
|     if(!sh_ts_residual_coding_disabled_flag) | |
|       sh_ts_residual_coding_rice_index | ue(v) |
|   } | |
|   ... | |
| } | | sh_residual_coding_rice_shift specifies the shift parameter used for the Rice parameter derivation process for abs_remainder[ ] and dec_abs_level[ ]. When sh_residual_coding_rice_shift is not present, the value of sh_residual_coding_rice_shift is inferred to be equal to 0.

sh_residual_coding_rice_offset specifies the offset parameter used for the Rice parameter derivation process and dec_abs_level[ ]. When sh_residual_coding_rice_offset is not present, the value of sh_residual_coding_rice_offset is inferred to be equal to 0.

sh_ts_residual_coding_rice_idx specifies the rice parameter used for the residual_ts_coding( ) syntax structure. When sh_ts_residual_coding_rice_index is not present, the value of sh_ts_residual_coding_rice_index is inferred to be equal to 0.

TABLE 29

| Rice parameter derivation process |
| --- |
| Binarization process for abs_remainder[ ] |
| . . . |
| The rice parameter cRiceParam is derived as follows: |
| -   *If sps_ts_residual_coding_info_flag is equal to 1,* |

TABLE 29-continued

| Rice parameter derivation process |
| --- |
| *transform_skip_flag[ x0 ][ y0 ][ cIdx ] is equal to 1 and sh_ts_residual_coding_disabled_flag is equal to 0, the Rice parameter cRiceParam is set equal to (sh_ts_residual_coding_rice_idx+TH).* |
| -   If transform_skip_flag[ x0 ][ y0 ][ cIdx ] is equal to 1 and sh_ts_residual_coding_disabled_flag is equal to 0, the Rice parameter cRiceParam is set equal to 1. |
| -   Otherwise, the rice parameter cRiceParam is derived by invoking the rice parameter derivation process for abs_remainder[ ] as specified in Table 1A with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs. |
| . . . |

TABLE 30

| Rice parameter derivation process |
| --- |
| Rice parameter derivation process for abs_remainder[ ] and dec_abs_level[ ] |
| Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, the binary logarithm of the transform block height log2TbHeight, *sh_residual_coding_rice_shift, and sh_residual_coding_rice_offset.* |
| Output of this process is the Rice parameter cRiceParam. |
| Given the array AbsLevel[ x ][ y ] for the transform block with component index cIdx and the top-left luma location ( x0, y0 ), the variable locSumAbs is derived as specified by the following pseudo code: |
|   locSumAbs = 0 |
|   if( xC < (1 << log2TbWidth) − 1 ) { |
|     locSumAbs += AbsLevel[ xC + 1 ][ yC ] |
|     if( xC < (1 << log2TbWidth) − 2 ) |
|       locSumAbs += AbsLevel[ xC + 2 ][ yC ] |
|     if( yC < (1 << log2TbHeight) − 1 ) |
|       locSumAbs += AbsLevel[ xC + 1 ][ yC + 1 ]        (1494) |
|   } |
|   if( yC < (1 << log2TbHeight) − 1 ) { |
|     locSumAbs += AbsLevel[ xC ][ yC + 1 ] |
|     if( yC < (1 << log2TbHeight) − 2 ) |
|       locSumAbs += AbsLevel[ xC ][ yC + 2 ] |
|   } |
|   locSumAbs = Clip3( 0, 31, ( (locSumAbs+ *sh_residual_coding_rice_offset*)>> *sh_residual_coding_rice_shift*) − baseLevel * 5 ) |
| Given the variable locSumAbs, the Rice parameter cRiceParam is derived specified in Table 1B. |
| *cRiceParam = cRiceParam+ sh_residual_coding_rice_shift* |
| When baseLevel is equal to 0, the variable ZeroPos[ n ] is derived as follows: |
| ZeroPos[ n ] = ( QState < 2 ? 1 : 2 ) << cRiceParam |

In yet another example, one syntax element is signaled for each transform skip slice to indicate the Rice parameter of that slice and two syntax elements are signaled for each transform slice to indicate the shift and/or offset parameters for derivation of Rice parameter of that slice. An example of the corresponding decoding process based on VVC Draft is illustrated as below. The changes to the VVC Draft are shown in Table 31 in bold and italic font. It is worth noting that the sh_residual_coding_rice_shift, sh_residual_coding_rice_offset, and sh_ts_residual_coding_rice_idx can be coded in different ways and/or may have the maximum value. For example, u(n), unsigned integer using n bits, or f(n), fixed-pattern bit string using n bits written (from left to right) with the left bit first, may also be used to encode/decode the same syntax element.

Slice Header Syntax

TABLE 31

| Syntax of residual coding | |
| --- | --- |
| slice_header( ) { | Descriptor |
| ... | |
| if( sps_transform_skip_enabled_flag && | |
| !sh_dep_quant_used_flag && | |
| !sh_sign_data_hiding_used_flag ) | |
| sh_ts_residual_coding_disabled_flag | u(1) |
| if(!sh_ts_residual_coding_disabled_flag) | |
| sh_ts_residual_coding_rice_idx | ue(v) |
| sh_residual_coding_rice_shift | ue(v) |
| sh_residual_coding_rice_offset | ue(v) |
| ... | |
| } | | sh_ts_residual_coding_rice_idx specifies the rice parameter used for the residual_ts_coding( ) syntax structure. When sh_ts_residual_coding_rice_idx is not present, the value of sh_ts_residual_coding_rice_idx is inferred to be equal to 0.

sh_residual_coding_rice_offset specifies the offset parameter used for the Rice parameter derivation process for abs_remainder[ ] and dec_abs_level[ ]. When sh_residual_coding_rice_offset is not present, the value of sh_residual_coding_rice_offset is inferred to be equal to 0.

sh_ts_residual_coding_rice_idx specifies the rice parameter used for the residual_ts_coding( ) syntax structure. When sh_ts_residual_coding_rice_index is not present, the value of sh_ts_residual_coding_rice_index is inferred to be equal to 0.

TABLE 32

| Rice parameter derivation process |
| --- |
| Binarization process for abs_remainder[ ] |
| . . . |
| The rice parameter cRiceParam is derived as follows: |
| - If transform_skip_flag[ x0 ][ y0 ][ cIdx ] is equal to 1 and sh_ts_residual_coding_disabled_flag is equal to 0, the Rice parameter cRiceParam is set equal to ***sh_ts_residual_coding_rice_idx*+1**. |
| - Otherwise, the rice parameter cRiceParam is derived by invoking the rice parameter derivation process for abs_remainder[ ] as specified in Table 1A with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs. |
| . . . |

TABLE 33

| Rice parameter derivation process |
| --- |
| Rice parameter derivation process for abs_remainder[ ] and dec_abs_level[ ] |
| Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, the binary logarithm of the transform block height log2TbHeight, *sh_residual_coding_rice_shift, and sh_residual_coding_rice_offset.* |
| Output of this process is the Rice parameter cRiceParam. |
| Given the array AbsLevel[ x ][ y ] for the transform block with component index cIdx and the top-left luma location ( x0, y0 ), the variable locSumAbs is derived as specified by the following pseudo code: |
| locSumAbs = 0 |

TABLE 33-continued

| Rice parameter derivation process |
| --- |
| if( xC < (1 << log2TbWidth) − 1 ) { |
|   locSumAbs += AbsLevel[ xC + 1 ][ yC ] |
|   if( xC < (1 << log2TbWidth) − 2 ) |
|     locSumAbs += AbsLevel[ xC + 2 ][ yC ] |
|   if( yC < (1 << log2TbHeight) − 1 ) |
|     locSumAbs += AbsLevel[ xC + 1 ][ yC + 1 ]    (1494) |
| } |
| if( yC < (1 << log2TbHeight) − 1 ) { |
|   locSumAbs += AbsLevel[ xC ][ yC + 1 ] |
|   if( yC < (1 << log2TbHeight) − 2 ) |
|     locSumAbs += AbsLevel[ xC ][ yC + 2 ] |
| } |
| locSumAbs = Clip3( 0, 31, ( (locSumAbs+ ***sh_residual_coding_rice_offset*)>> *sh_residual_coding_rice_shift*)** − baseLevel * 5 ) |
| Given the variable locSumAbs, the Rice parameter cRiceParam is derived specified in Table 1B. |
| *cRiceParam = cRiceParam+ sh_residual_coding_rice_shift* |
| When baseLevel is equal to 0, the variable ZeroPos[ n ] is derived as follows: |
| ZeroPos[ n ] = ( QState < 2 ? 1 : 2 ) << cRiceParam |

In yet another example, one control flag is signaled in picture parameter set range extensions syntax to indicate whether the signaling of Rice parameter for the transform skip blocks and the signaling of shift and/or offset parameters for derivation of the rice parameter in the transform blocks are enabled or disabled. When the control flag is signaled as enabled, one syntax element is further signaled to indicate the Rice parameter for transform skip residual coding of that picture and two syntax elements are further signaled for regular residual coding to indicate the shift and/or offset parameters for derivation of Rice parameter of that picture. When the control flag is signaled as disabled (e.g. set equal to "0"), no further syntax element is signaled at lower level to indicate the Rice parameter for transform skip residual coding and a default Rice parameter (e.g. 1) is used for all the transform skip residual coding and no further syntax element is signaled at lower level to indicate the shift and/or offset parameters for derivation of Rice parameter for the regular residual coding and default shift and/or offset parameters (e.g. 0) is used for all the regular residual coding. An example of the corresponding decoding process based on VVC Draft is illustrated as below, where TH is a predefined value (e.g. 0, 1, 2). The changes to the VVC Draft are shown in Table 34 in bold and italic font. It is worth noting that the pps_residual_coding_rice_shift, pps_residual_coding_rice_offset, and pps_ts_residual_coding_rice_idx can be coded in different ways and/or may have the maximum value. For example, u(n), unsigned integer using n bits, or f(n), fixed-pattern bit string using n bits written (from left to right) with the left bit first, may also be used to encode/decode the same syntax element.

Picture Parameter Set Range Extensions Syntax

TABLE 34

| Syntax of residual coding | |
| --- | --- |
| pps_range_extensions( ) { | Descriptor |
| ... | |
| pps_residual_coding_info_flag | u(1) |
| if(pps_ts_residual_coding_rice_flag ) | |
| pps_residual_coding_rice_shift | ue(v) |

TABLE 34-continued

| Syntax of residual coding | |
|---|---|
| pps_range_extensions( ) { | Descriptor |
| pps_residual_coding_rice_offset | ue(v) |
| pps_ts_residual coding rice_idx | ue(v) |
| } | |
| ... | | pps_residual_coding_info_flag equal to 1 specifies that pps_residual_coding_rice_shift, pps_residual_coding_rice_offset, and pps_ts_residual_coding_rice_index could be present in the current picture. pps_residual_coding_info_flag equal to 0 specifies that pps_residual_coding_rice_shift, pps_residual_coding_rice_offset, and pps_ts_residual_coding_rice_idx are not present in the current picture. When pps_residual_coding_info_flag is not present, the value of pps_residual_coding_info_flag is inferred to be equal to 0.

pps_residual_coding_rice_shift specifies the shift parameter used for the Rice parameter derivation process for abs_remainder[ ] and dec_abs_level[ ]. When pps_residual_coding_rice_shift is not present, the value of pps_residual_coding_rice_shift is inferred to be equal to 0.

pps_residual_coding_rice_offset specifies the offset parameter used for the Rice parameter derivation process for abs_remainder[ ] and dec_abs_level[ ]. When pps_residual_coding_rice_offset is not present, the value of pps_residual_coding_rice_offset is inferred to be equal to 0.

pps_ts_residual_coding_rice_idx specifies the rice parameter used for the residual_ts_coding( ) syntax structure. When pps_ts_residual_coding_rice_index is not present, the value of pps_ts_residual_coding_rice_index is inferred to be equal to 0.

TABLE 35

Rice parameter derivation process

Binarization process for abs_remainder[ ]
. . .
The rice parameter cRiceParam is derived as follows:
- *If pps_ts_residual_coding_rice_flag is equal to 1, transform_skip_flag[ x ][ y0 ][ cIdx ] is equal to 1 and sh_ts_residual_coding_disabled_flag is equal to 0, the Rice parameter cRiceParam is set equal to (pps_ts_residual_coding_rice_idx+TH).*
- If transform_skip_flag[ x0 ][ y0 ][ cIdx ] is equal to 1 and sh_ts_residual_coding_disabled_flag is equal to 0, the Rice parameter cRiceParam is set equal to 1.
- Otherwise, the rice parameter cRiceParam is derived by invoking the rice parameter derivation process for abs_remainder[ ] as specified in Table 1A with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.
. . .

TABLE 36

Rice parameter derivation process

Rice parameter derivation process for abs_remainder[ ] and dec_abs_level[ ]
Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, the binary TABLE 36-continued Rice parameter derivation process logarithm of the transform block height log2TbHeight,
*pps_residual_coding_rice_shift, and pps_residual_coding_rice_offset.*
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:
    locSumAbs = 0
    if( xC < (1 << log2TbWidth) − 1 ) {
        locSumAbs += AbsLevel[ xC + 1 ][ yC ]
        if( xC < (1 << log2TbWidth) − 2 )
            locSumAbs += AbsLevel[ xC + 2 ][ yC ]
        if( yC < (1 << log2TbHeight) − 1 )
            locSumAbs += AbsLevel[ xC + 1 ][ yC + 1 ]          (1494)
    }
    if( yC < (1 << log2TbHeight) − 1 ) {
        locSumAbs += AbsLevel[ xC ][ yC + 1 ]
        if( yC < (1 << log2TbHeight) − 2 )
            locSumAbs += AbsLevel[ xC ][ yC + 2 ]
    }
    locSumAbs = Clip3( 0, 31, ( (locSumAbs+
    *pps_residual_coding_rice_offset*)>>
    *pps_residual_coding_rice_shift*) − baseLevel * 5 )
Given the variable locSumAbs, the Rice parameter cRiceParam is derived specified in Table 1B.
*cRiceParam = cRiceParam+ pps_residual_coding_rice_shift*
When baseLevel is equal to 0, the variable ZeroPos[ n ] is derived as follows:
ZeroPos[ n ] = ( QState < 2 ? 1 : 2 ) << cRiceParam According to one or more examples of the disclosure, it is proposed to use different rice parameters for coding certain syntax elements, e.g. abs_remainder in transform skip residual coding, shift and offset parameters for derivation of the rice parameter used for abs_remainder/dec_abs_level in regular residual coding, and determine which one to use according to certain coded information of the current block, e.g. quantization parameter or coding bit-depth associated with the TB/CB and/or the slice/profile, and/or according to a new flag associated with the TB/CB/slice/picture/sequence level, e.g sps_residual_coding_info_present_in_sh_flag.

In one example, one control flag is signaled in slice header to indicate whether the derivation process of Rice parameter for the transform skip blocks and the derivation process of shift and/or offset parameters for the rice parameter in the transform blocks are enabled or disabled. When the control flag is signaled as enabled, the Rice parameter may be different in different condition according to certain coded information of the current block, e.g., quantization parameter and bit depth. And the shift and/or offset parameters for derivation of Rice parameter in regular residual coding may be different in different condition according to certain coded information of the current block, e.g., quantization parameter and bit depth. When the control flag is signaled as disabled (e.g., set equal to "0"), a default Rice parameter (e.g., 1) is used for all the transform skip slice and default shift and/or offset parameters (e.g., 0) are used for all the transform slice. An example of the corresponding decoding process based on VVC Draft is illustrated as below, where $TH_A$ and $TH_B$ are predefined thresholds (e.g., $TH_A$=8, $TH_B$=18 or 19). The changes to the VVC Draft are shown in Table 37 in bold and italic font. It is worth noting that the same logics can be implemented differently in practice. For example, certain equations, or a look-up table, may also be used to derive the same rice parameters.

Slice Header Syntax

TABLE 37

| Syntax of residual coding | |
| --- | --- |
| slice_header( ) { | Descriptor |
| ... | |
| if( sps_transform_skip_enabled_flag && | |
| !sh_dep_quant_used_flag && | |
| !sh_sign_data_hiding_used_flag ) | |
| sh_ts_residual_coding_disabled_flag | u(1) |
| sh_residual_coding_rice_flag | u(1) |
| ... | | sh_residual_coding_rice_flag equal to 1 specifies that bitdepth dependent Rice parameter derivation process is used in the current slice. sh_residual_coding_rice_flag equal to 0 specifies that bitdepth dependent Rice parameter derivation process is not used in the current slice.

TABLE 38

| Rice parameter derivation process |
| --- |
| Binarization process for abs_remainder[ ] |
| . . . |
| The rice parameter cRiceParam is derived as follows: |
| - *If sh_residual_coding_rice flag is equal to 1, transform_skip_flag[ x0 ][ y0 ][ cIdx ] is equal to 1 and sh_ts_residual_coding_disabled_flag is equal to 0, the Rice parameter cRiceParam is set equal to Clip3( 1, BitDepth – TH$_A$, (TH$_B$ – QP)/6 ).* |
| - If transform skip_flag[ x0 ][ y0 ][ cIdx ] is equal to 1 and sh_ts_residual_coding_disabled_flag is equal to 0, the Rice parameter cRiceParam is set equal to 1. |
| - Otherwise, the rice parameter cRiceParam is derived by invoking the rice parameter derivation process for abs_remainder[ ] as specified in Table 1A with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs. |
| . . . |

TABLE 39

| Rice parameter derivation process |
| --- |
| Rice parameter derivation process for abs_remainder[ ] and dec_abs_level[ ] |
| Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, the binary logarithm of the transform block height log2TbHeight, sh_residual_coding_rice_flag. |
| Output of this process is the Rice parameter cRiceParam. |
| Given the array AbsLevel[ x ][ y ] for the transform block with component index cIdx and the top-left luma location ( x0, y0 ), the variable locSumAbs is derived as specified by the following pseudo code: |
| *ShiftRice = sh_residual_coding_rice_flag ? (BitDepth > 10) ? Floor(Log2(4 \*(Bitdepth − 10))) : 0 : 0* |
| *OffsetRice = sh_residual_coding_rice_flag ? (ShiftRice > 0) ? (1 << (ShiftRice − 1)) : 0 : 0* |
| locSumAbs = 0 |
| if( xC < (1 << log2TbWidth) − 1 ) { |
|   locSumAbs += AbsLevel[ xC + 1 ][ yC ] |
|   if( xC < (1 << log2TbWidth) − 2 ) |
|     locSumAbs += AbsLevel[ xC + 2 ][ yC ] |
|   if( yC < (1 << log2TbHeight) − 1 ) |
|     locSumAbs += AbsLevel[ xC + 1 ][ yC + 1 ]          (1494) |
| } |
| if( yC < (1 << log2TbHeight) − 1 ) { |
|   locSumAbs += AbsLevel[ xC ][ yC + 1 ] |
|   if( yC < (1 << log2TbHeight) − 2 ) |
|     locSumAbs += AbsLevel[ xC ][ yC + 2 ] |
| } |
| locSumAbs = Clip3( 0, 31, ( ( locSumAbs + *OffsetRice*) >> *ShiftRice*) − baseLevel * 5 ) |
| Given the variable locSumAbs, the Rice parameter cRiceParam is derived specified in Table 1B. |
| *cRiceParam = cRiceParam+ ShiftRice* |
| When baseLevel is equal to 0, the variable ZeroPos[ n ] is derived as follows: |
| ZeroPos[ n ] = ( QState < 2 ? 1 : 2 ) << cRiceParam |

In yet another example, the corresponding decoding process based on VVC Draft is illustrated as below, where TH is a predefined threshold (e.g., 18, 19). The changes to the VVC Draft are shown in Table 40 in bold and italic font. It is worth noting that the same logics can be implemented differently in practice. For example, certain equations, or a look-up table, may also be used to derive the same rice parameters.

TABLE 40

| Rice parameter derivation process |
| --- |
| Binarization process for abs_remainder[ ] |
| . . . |
| The rice parameter cRiceParam is derived as follows: |
| - *If BitDepth is greater than 10, transform_skip_flag[ x0 ][ y0 ][ cIdx ] is equal to 1 and sh_ts_residual_coding_disabled_flag is equal to 0, the derivation process for Rice parameter cRiceParam is specified as below.* |
|   *rice parameter = Clip3( 1, 8, (TH − QP)/6 )* |
| - If transform_skip_flag[ x0 ][ y0 ][ cIdx ] is equal to 1 and sh_ts_residual_coding_disabled_flag is equal to 0, the Rice parameter cRiceParam is set equal to 1. |
| - Otherwise, the rice parameter cRiceParam is derived by invoking the rice parameter derivation process for abs_remainder[ ] as specified in Table 1A with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs. |
| Rice parameter derivation process for abs_remainder[ ] and dec_abs_level[ ] |
| Inputs to this process are the base level baseLevel, the colour component index cIdx, the luma location ( x0, y0 ) specifying the |

TABLE 40-continued

Rice parameter derivation process top-left sample of the current transform block relative to the top-left
sample of the current picture, the current coefficient scan location (
xC, yC ), the binary logarithm of the transform block width
log2TbWidth, the binary logarithm of the transform block height
log2TbHeight.
Output of this process is the Rice parameter cRiceParam.
Given the array AbsLevel[ x ][ y ] for the transform block with
component index cIdx and the top-left luma location ( x0, y0 ), the
variable locSumAbs is derived as specified by the following pseudo
code:
$\textbf{ShiftRice} = (\textbf{BitDepth} > 10) \ ? \ \textbf{Floor}(\textbf{Log2}(4 \ *(\textbf{Bitdepth} - 10))) :$
$\textbf{0}$
$\textbf{OffsetRice} = (\textbf{BitDepth} > 10) \ ? \ (\textbf{ShiftRice} > 0) \ ? \ (1 << (\textbf{ShiftRice}$
$- 1)) : 0 : 0$
locSumAbs = 0
if( xC < (1 << log2TbWidth) − 1 ) {
    locSumAbs += AbsLevel[ xC + 1 ][ yC ]
    if( xC < (1 << log2TbWidth) − 2 )
        locSumAbs += AbsLevel[ xC + 2 ][ yC ]
    if( yC < (1 << log2TbHeight) − 1 )
        locSumAbs += AbsLevel[ xC + 1 ][ yC + 1 ]    (1494)
}
if( yC < (1 << log2TbHeight) − 1 ) {
    locSumAbs += AbsLevel[ xC ][ yC + 1 ]
    if( yC < (1 << log2TbHeight) − 2 )
        locSumAbs += AbsLevel[ xC ][ yC + 2 ]
}
locSumAbs = Clip3( 0, 31, ( ( locSumAbs + $\textbf{OffsetRice}$) >>
$\textbf{ShiftRice}$) − baseLevel * 5 )
Given the variable locSumAbs, the Rice parameter cRiceParam is
derived specified in Table 1B.
$\textbf{cRiceParam} = \textbf{cRiceParam} + \textbf{ShiftRice}$
When baseLevel is equal to 0, the variable ZeroPos[ n ] is derived
as follows:
ZeroPos[ n ] = ( QState < 2 ? 1 : 2 ) << cRiceParam According to another aspect of the disclosure, it is proposed to add the constraint that the value of these above coding tools flags to provide the same general constraint controls as others in general constraint information.

For example, sps_ts_residual_coding_rice_present_in_sh_flag equal to 1 specifies that sh_ts_residual_coding_rice_idx could be present in SH syntax structures referring to the SPS. sps_ts_residual_coding_rice_present_in_sh_flag equal to 0 specifies that sh_ts_residual_coding_rice_idx is not present in SH syntax structures referring to the SPS. According to the disclosure, it is proposed to add the syntax element, gci_no_ts_residual_coding_rice_constraint_flag, in the general constraint information syntax to provide the same general constraint controls as other flags. An example of the decoding process on VVC Draft is illustrated below. The changes to the VVC Draft are highlighted. The added parts are highlighted with italic fonts.

| general_constraint_info( ) { | Descriptor |
|---|---|
| ... | |
| gci_no_ts_residual_coding_rice_constraint_flag | u(1) |
| ... | |
| } | | gci_no_ts_residual_coding_rice_constraint_flag equal to 1 specifies that
sps_ts_residual_coding_rice_present_in_sh_flag shall be equal to 0.
gci_no_ts_residual_coding_rice_constraint_flag equal to 0 does not impose such a
constraint.

In another example, pps_ts_residual_coding_rice_flag equal to 1 specifies that pps_ts_residual_coding_rice_index could be present in the current picture. pps_ts_residual_coding_rice_flag equal to 0 specifies that pps_ts_residual_coding_rice_idx is not present in the current picture. According to the disclosure, it is proposed to add the syntax element, gci_no_ts_residual_coding_rice_constraint_flag, in the general constraint information syntax to provide the same general constraint controls as other flags. An example of the decoding process on VVC Draft is illustrated below. The changes to the VVC Draft are highlighted. The added parts are highlighted with italic fonts.

| general_constraint_info( ) { | Descriptor |
| --- | --- |
| ... | |
| gci_no_ts_residual_coding_rice_constraint_flag | u(1) |
| ... | |
| } | |
| gci_no_ts_residual_coding_rice_constraint_flag equal to 1 specifies that pps_ts_residual_coding_rice_flag shall be equal to 0. gci_no_ts_residual_coding_rice_constraint_flag equal to 0 does not impose such a constraint. | |

In yet another example, sps_rice_adaptation_enabled_flag equal to 1 indicates that Rice parameter for the binarization of abs_remainder[ ] and dec_abs_level may be derived by a formula.

The formula may include: RiceParam=RiceParam+shiftVal and shiftVal=(localSumAbs<Tx[0])?Rx[0]:((localSumAbs<Tx[1])?Rx[1]:((localSumAbs<Tx[2])?Rx[2]:((localSumAbs<Tx[3])?Rx[3]:Rx[4]))), where the lists Tx[ ] and Rx[ ] are specified as follows:
Tx[ ]={32, 128, 512, 2048}>>(1523) Rx[ ]={0, 2, 4, 6, 8}

According to the disclosure, it is proposed to add the syntax element, gci_no_rice_adaptation_constraint_flag, in the general constraint information syntax to provide the same general constraint controls as other flags. An example of the decoding process on VVC Draft is illustrated below. The changes to the VVC Draft are highlighted. The added parts are highlighted with italic fonts.

| general_constraint_info( ) { | Descriptor |
| --- | --- |
| ... | |
| gci_no_rice_adaptation_constraint_flag | u(1) |
| ... | |
| } | |
| gci_no_rice_adaptation_constraint_flag_equal equal to 1 specifies that sps_rice_adaptation_enabled_flag shall be equal to 0. gci no rice adaptation constraint flag equal to 0 does not impose such a constraint. | |

Since the proposed rice parameter adaptation scheme is only used for transform skip residual coding (TSRC), the proposed method can only take effective when the TSRC is enabled. Correspondingly, in one or more embodiments of the disclosure, it is proposed to add one bti-stream constraint that requires the value of gci_no_rice_adaptation_constraint_flag to be one when the transform skip mode is disabled from general constraint information level, e.g., when the value of gci_no_transform_skip_constraint_flag is set to one.

In yet another example, sps_range_extension_flag equal to 1 specifies that the sps_range_extension( ) syntax structure is present in the SPS RBSP syntax structure. sps_range_extension_flag equal to 0 specifies that this syntax structure is not present. According to the disclosure, it is proposed to add the syntax element, gci_no_range_extension_constraint_flag, in the general constraint information syntax to provide the same general constraint controls as other flags. An example of the decoding process on VVC Draft is illustrated below. The changes to the VVC Draft are highlighted. The added parts are highlighted with italic fonts.

| general_constraint_info( ) { | Descriptor |
|---|---|
| ... | |
| gci_no_range_extension_constraint_flag | u(1) |
| ... | |
| } | | gci_no_range_extension_constraint_flag equal to 1 specifies that sps_range_extension_flag shall be equal to 0. gci_no_range_extension_constraint_flag equal to 0 does not impose such a constraint.

FIG. 9 shows a method for video coding according to one example of the present disclosure. The method may be, for example, applied to a decoder. In Step 1902, the decoder may receive a Sequence Parameter Set (SPS) range extension flag that indicates whether a syntax structure, sps_range_extension, is present in Slice Head (SH) Raw Byte Sequence Payload (RBSP) syntax structures based on a value of the SPS range extension flag.

In Step 1904, in response to determining that the value of the SPS range extension flag equals to 1, the decoder may determine that the sps_range_extension is present in the SH RBSP syntax structures.

In Step 1906, in response to determining that the value of the range extension flag equals to 0, the decoder may determine that the sps_range_extension is not present in the SH RBSP syntax structures.

In yet another example, sps_cabac_bypass_alignment_enabled_flag equal to 1 specifies that the value of ivlCurrRange may be aligned prior to bypass decoding of the syntax elements sb_coded_flag[ ][ ], abs_remainder[ ], dec_abs_level[n], and coeff_sign_flag[ ]. sps_cabac_bypass_alignment_enabled_flag equal to 0 specifies that the value of ivlCurrRange is not aligned prior to bypass decoding. According to the disclosure, it is proposed to add the syntax element, gci_no_cabac_bypass_alignment_constraint_flag, in the general constraint information syntax to provide the same general constraint controls as other flags. An example of the decoding process on VVC Draft is illustrated below. The changes to the VVC Draft are highlighted. The added parts are highlighted with italic fonts.

| general_constraint_info( ) { | Descriptor |
|---|---|
| ... | |
| gci_no_cabac_bypass_alignment_constraint_flag | u(1) |
| ... | |
| } | | gci_no_cabac_bypass_alignment_constraint_flag equal to 1 specifies that sps_cabac_bypass_alignment_enabled_flag shall be equal to 0. gci_no_cabac_bypass_alignment_constraint_flag equal to 0 does not impose such a constraint.

FIG. 10 shows a method for video coding according to one example of the present disclosure. The method may be, for example, applied to a decoder. In Step 2002, the decoder may receive a Sequence Parameter Set (SPS) alignment enabled flag that indicates whether an index, ivlCurrRange, is aligned prior to bypass decoding of syntax elements sb_coded_flag, abs_remainder, dec_abs_level, and coeff_sign_flagn based on a value of the SPS alignment enabled.

In Step 2004, in response to determining that the value of the SPS alignment enabled flag equals to 1, the decoder may determine that the ivlCurrRange is aligned prior to bypass decoding.

In Step 2006, in response to determining that the value of the SPS alignment enabled flag equals to 0, the decoder may determine that the ivlCurrRange is not aligned prior to bypass decoding.

In yet another example, extended_precision_processing_flag equal to 1 specifies that an extended dynamic range may be used for transform coefficients and transform processing. extended_precision_processing_flag equal to 0 specifies that the extended dynamic range is not used. According to the disclosure, it is proposed to add the syntax element, gci_no_extended_precision_processing_constraint_flag, in the general constraint information syntax to provide the same general constraint controls as other flags. An example of the decoding process on VVC Draft is illustrated below. The changes to the VVC Draft are highlighted. The added parts are highlighted with italic fonts.

| general_constraint_info( ) { | Descriptor |
| --- | --- |
| ... | |
| gci_no_extended_precision_processing_constraint_flag | u(1) |
| ... | |
| } | | gci_no_extended_precision_processing_constraint_flag equal to 1 specifies that extended_precision_processing_flag shall be equal to 0. gci_no_extended_precision_processing_constraint_flag equal to 0 does not impose such a constraint.

FIG. 11 shows a method for video coding according to one example of the present disclosure. The method may be, for example, applied to a decoder. In Step 2102, the decoder may receive an extended precision processing flag that indicates whether an extended dynamic range is adopted for transform coefficients and during transform processing based on a value of the extended precision processing flag.

In Step 2104, in response to determining that the value of the extended precision processing flag equals to 1, the decoder may determine that the extended dynamic range is adopted for the transform coefficients and during the transform processing.

In Step 2106, in response to determining that the value of the extended precision processing flag to 0, the decoder may determine that the extended dynamic range is not adopted for the transform coefficients or during the transform processing.

In yet another example, persistent_rice_adaptation_en-abled_flag equal to 1 specifies that the Rice parameter derivation for the binarization of abs_remainder[ ] and dec_abs_level may be initialized at the start of each sub-block using mode dependent statistics accumulated from previous sub-blocks. persistent_rice_adaptation_enabled_flag equal to 0 specifies that no previous sub-block state is used in Rice parameter derivation. According to the disclosure, it to add is proposed the syntax element, gci_no_persistent_rice_adaptation_constraint_flag, in the general constraint information syntax to provide the same general constraint controls as other flags. An example of the decoding process on VVC Draft is illustrated below. The changes to the VVC Draft are highlighted. The added parts are highlighted with italic fonts.

| general_constraint_info( ) { | Descriptor |
|---|---|
| ... | |
| gci_no_persistent_rice_adaptation_constraint_flag | u(1) |
| ... | |
| } | |
| gci_no_persistent_rice_adaptation_constraint_flag equal equal to 1 specifies that persistent_rice_adaptation_enabled_flag shall be equal to 0. gci_no_persistent_rice_adaptation_constraint_flag equal to 0 does not impose such a constraint. | |

FIG. 12 shows a method for video coding according to one example of the present disclosure. The method may be, for example, applied to a decoder. In Step 2202, the decoder may receive a persistent rice adaption enabled flag that indicates whether a rice parameter derivation for binarization of abs_remainder and dec_abs_level is initialized at start of each sub-block adopting mode dependent statistics accumulated from previous sub-blocks based on a value of the persistent rice adaption enabled flag.

In Step 2204, in response to determining that the value of the persistent rice adaption enabled flag equals to 1, the decoder may determine that the rice parameter derivation for binarization is initialized at the start of each sub-block adopting mode dependent statistics accumulated from the previous sub-blocks.

In Step 2206, in response to determining that the value of the persistent rice adaption enabled flag to 0, the decoder may determine that no previous sub-block state is adopted in the rice parameter derivation.

In yet another example, sps_rrc_rice_extension_flag equal to 1 specifies that an extension of Rice parameter derivation for the binarization of abs_remainder[ ] and dec_abs_level[ ] is enabled. sps_rrc_rice_extension_flag equal to 0 specifies that the extension of Rice parameter derivation for the binarization of abs_remainder[ ] and dec_abs_level[ ] is disabled. According to the disclosure, it is proposed to add the syntax element, gci_no_rrc_rice_extension_flag, in the general constraint information syntax to provide the same general constraint controls as other flags. An example of the decoding process on VVC Draft is illustrated below. The changes to the VVC Draft are highlighted. The added parts are illustrated in italic font below.

| general_constraint_info( ) { | Descriptor |
|---|---|
| ... | |
| gci_no_rrc_rice_extension_flag | u(1) |
| ... | |
| } | |
| gci_no_rrc_rice_extension_flag equal to 1 specifies that sps_rrc_rice_extension_flag shall be equal to 0. gci_no_rrc_rice_extension_flag equal to 0 does not impose such a constraint. | |

Figure 17:
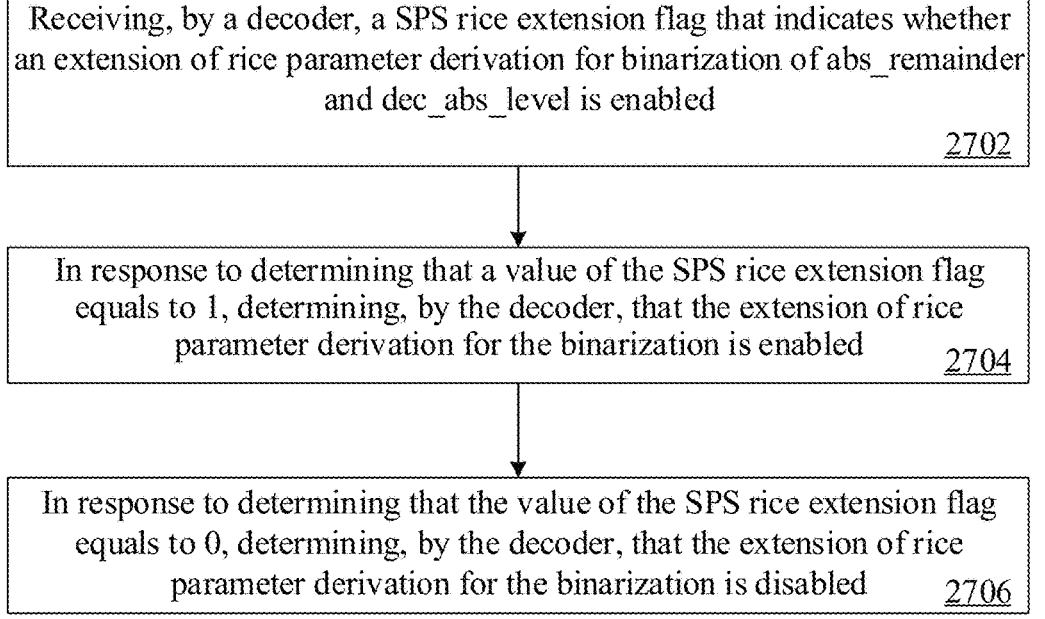
FIG. 17 illustrates a method for video decoding, according to an example of the present disclosure.

FIG. 17 shows a method for video decoding according to one example of the present disclosure. The method may be, for example, applied to a decoder. In Step 2702, the decoder may receive a SPS rice extension flag that indicates whether an extension of rice parameter derivation for binarization of abs_remainder and dec_abs_level is enabled.

In Step 2704, in response to determining that a value of the SPS rice extension flag equals to 1, the decoder may determine that the extension of rice parameter derivation for the binarization is enabled.

In Step 2706, in response to determining that the value of the SPS rice extension flag equals to 0, the decoder may determine that the extension of rice parameter derivation for the binarization is disabled.

In yet another example, sps_persistent_rice_adaptation_enabled_flag equal to 1 specifies that Rice parameter derivation for the binarization of abs_remainder[ ] and dec_abs_level[ ] is initialized at the start of each TU using statistics accumulated from previous TUs. sps_persistent_rice_adaptation_enabled_flag equal to 0 specifies that no previous TU state is used in Rice parameter derivation. According to the disclosure, it is proposed to add the syntax element, gci_no_persistent_rice_adaptation_enabled_flag, in the general constraint information syntax to provide the same general constraint controls as other flags. An example of the decoding process on VVC Draft is illustrated below. The changes to the VVC Draft are highlighted. The added parts are illustrated in italic font below.

| general_constraint_info( ) { | Descriptor |
| --- | --- |
| ... | |
| gci_no_persistent_rice_adaptation_enabled_flag | u(1) |
| ... | |
| } | | gci_no_persistent_rice_adaptation_enabled_flag equal to 1 specifies that sps_persistent_rice_adaptation_enabled_flag shall be equal to 0. gci_no_persistent_rice_adaptation_enabled_flag equal to 0 does not impose such a constraint.

FIG. 18 shows a method for video decoding according to one example of the present disclosure. The method may be, for example, applied to a decoder. In Step 2802, the decoder may receive a SPS rice adaption enabled flag that indicates whether rice parameter derivation for binarization of abs_remainder and dec_abs_level is initialized at start of each transform unit with statistics accumulated from previous TUs.

In Step 2804, in response to determining that a value of the SPS rice adaption enabled flag equals to 1, the decoder may determine that the rice parameter derivation for the binarization is initialized at start of each TU with the statistics accumulated from the previous TUs.

In Step 2806, in response to determining that the value of the SPS rice adaption enabled flag equals to 0, the decoder may determine that no previous TU state is adopted in rice parameter derivation.

In yet another example, sps_reverse_last_sig_coeff_enabled_flag equal to 1 specifies that sh_reverse_last_sig_coeff_flag is present in slice_header( ) syntax structure referring to the SPS. sps_reverse_last_sig_coeff_enabled_flag equal to 0 specifies that sh_reverse_last_sig_coeff_flag is not present in slice_header( ) syntax structure referring to the SPS. According to the disclosure, it is proposed to add the syntax element, gci_no_reverse_last_sig_coeff_enabled_flag, in the general constraint information syntax to provide the same general constraint controls as other flags. An example of the decoding process on VVC Draft is illustrated below. The changes to the VVC Draft are highlighted. The added parts are highlighted with italic font.

| general_constraint_info( ) { | Descriptor |
| --- | --- |
| ... | |
| gci_no_reverse_last_sig_coeff_enabled_flag | u(1) |
| ... | |
| } | | gci_no_reverse_last_sig_coeff_enabled_flag equal to 1 specifies that sps_reverse_last_sig_coeff_enabled_flag shall be equal to 0. On the other hand, gci_no_reverse_last_sig_coeff_enabled_flag equal to 0 does not impose such a constraint.

sh_reverse_last_sig_coeff_flag equal to 1 specifies that the coordinates of the last significant coefficient are coded relative to ((Log 2ZoTbWidth <<1)−1, (Log 2ZoT-bHeight<<1)−1) for each transform block of the current slice. sh_reverse_last_sig_coeff_flag equal to 0 specifies that the coordinates of the last significant coefficient are coded relative to (0, 0) for each transform block of the current slice. When not present, the value of sh_reverse_last_sig_coeff_flag is inferred to be equal to 0.

FIG. 19 shows a method for video decoding according to one example of the present disclosure. The method may be, for example, applied to a decoder. In Step 2902, the decoder may receive a SPS reversed coordinates of the last significant coefficient enabled flag that indicates whether an SH reversed coordinates of the last significant coefficient enabled flag is present in slice header syntax structure referring to the SPS.

In Step 2904, in response to determining that a value of the SPS reversed coordinates of the last significant coefficient enabled flag equals to 1, the decoder may determine that the SH reversed coordinates of the last significant coefficient enabled flag is present in the slice header syntax structure referring to the SPS.

In Step 2906, in response to determining that the value of the SPS reversed coordinates of the last significant coeffimay receive a SPS transform precision adaption enabled flag that indicates whether downshifts in a scaling process for transform coefficients and in a transformation process for scaled transform coefficients are adaptively assigned by examining coefficients values of dequantization and inverse transform.

In Step 3004, in response to determining that a value of the SPS transform precision adaption enabled flag equals to 1, the decoder may determine that the downshifts in the scaling process for the transform coefficients and in the transformation process for the scaled transform coefficients are adaptively assigned by examining the coefficients values of dequantization and inverse transform.

In yet another example, sps_high_throughput_flag equal to 1 specifies that all the syntax elements in residual coding, except for last significant coefficient position in RRC, are coded through bypass mode and alignment is needed only once after the last significant coefficient position in RRC and at the very beginning of a TB in TSRC. According to the disclosure, it is proposed to add the syntax element, gci_no_high_throughput_flag, in the general constraint information syntax to provide the same general constraint controls as other flags. An example of the decoding process on VVC Draft is illustrated below. The changes to the VVC Draft are highlighted. The added parts are highlighted with italic font.

| general_constraint_info( ) { | Descriptor |
|---|---|
| ... | |
| gci_no_high_throughput_flag | u(1) |
| ... | |
| } | | gci_no_high_throughput_flag equal to 1 specifies that sps_high_throughput_flag shall be equal to 0. On the other hand, gci_no_high_throughput_flag equal to 0 does not impose such a constraint.

cient enabled flag equals to 0, the decoder may determine that the SH reversed coordinates of the last significant coefficient enabled flag is not present in the slice header syntax structure referring to the SPS.

In yet another example, sps_transform_precision_adaptation_enabled_flag equal to 1 specifies that the downshifts in the scaling process for transform coefficients and in the transformation process for scaled transform coefficients are adaptively assigned by examining the coefficients values of upon dequantization and inverse transform. According to the disclosure, it is proposed to add the syntax element, gci_no_transform_precision_adaptation_enabled_flag, in the general constraint information syntax to provide the same general constraint controls as other flags. An example of the decoding process on VVC Draft is illustrated below. The changes to the VVC Draft are highlighted. The added parts are highlighted with italic font.

FIG. 21 shows a method for video decoding according to one example of the present disclosure. The method may be, for example, applied to a decoder. In Step 3102, the decoder may receive a SPS high throughout flag that indicates whether syntax elements in residual coding are coded through bypass mode.

In Step 3104, in response to determining that a value of the SPS high throughout flag equals to 1, the decoder may determine that all syntax elements in the residual coding, except last significant coefficient position in regular residual coding (RRC), are coded through the bypass mode, and alignment is performed after the last significant coefficient position in RRC and at beginning of a transform block (TB) in transform skip residual coding (TSRC).

The above methods may be implemented using an apparatus that includes one or more circuitries, which include application specific integrated circuits (ASICs), digital sig-

| general_constraint_info( ) { | Descriptor |
|---|---|
| ... | |
| gci_no_transform_precision_adaptation_enabled_flag | u(1) |
| ... | |
| } | | gci_no_transform_precision_adaptation_enabled_flag equal to 1 specifies that sps_transform_precision_adaptation_enabled_flag shall be equal to 0. On the other hand, gci no transform precision adaptation enabled flag equal to 0 does not impose such a constraint.

FIG. 20 shows a method for video decoding according to one example of the present disclosure. The method may be, for example, applied to a decoder. In Step 3002, the decoder nal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Rice Parameter Decision

At the encoder side, TSRC encoding may require multiple encoding passes to derive the best Rice parameter. This multi-pass encoding may not be suitable for practical hardware encoder designs. To solve this problem, a low-delay TSRC encoding method is also proposed. According to one or more examples of the disclosure, it is proposed to derive Rice parameter according to certain coded information of the current slice, e.g., quantization parameter and/or coding bit-depth associated with the slice/picture/sequence, and/or according to a hash ratio associated with the slice/picture/sequence level. Different methods may be used to derive the Rice parameter, with some exemplar methods listed as follows. It is noted that the following methods may be applied independently or jointly.

1. The Rice parameter mentioned in the embodiments above may be additionally dependent on video resolution, including both temporal resolution (e.g., frame rate) and spatial resolution (e.g., picture width and height) of the video.

2. The Rice parameter may vary at sequence level, picture level, slice level and/or any predefined region. In one specific example, different Rice values are used for pictures with different temporal layer IDs (which is related to the nuh_temporal_id_plus1 specified in VVC specification). Alternatively, Rice parameter may include a value determined based on the QP values used at sequence level, picture level, slice level and/or any predefined region. For example, rice parameter=Clip3 (1, 8, (TH–QP)/6), where TH is a predefined threshold (e.g. 18, 19).

3. The Rice parameter may be set as a default value, e.g., 1, according to the change of coded information between the current slice and previous slice. In one specific example, default Rice value is used for pictures when its temporal layer ID is changed compared to previous picture. Alternatively, default Rice value is used for pictures when ΔQ is larger than TH, where ΔQ is calculated as abs (QPcurrent–QPprevious) and TH is a predefined threshold. Rice parameter (e.g., 0, 5). For example, Rice parameter=1 when the hash ratio form Intra Block Copy mode in current slice is larger than TH, where TH is a predefined threshold, e.g., Max (41*(number of CTUs), 4200).

4. Rice parameter for each slice based on the values of abs_remainder that are coded in its preceding slice according to the coding order. In one specific example, after one slice is coded, the number of bins for the binarization of abs_remainder using different Rice parameters are computed which are then used to determine the Rice parameter of the following slice. For example, the Rice parameter which achieves the minimal bin number in the preceding slice will be selected for current slice. For another example, if the current slice and its preceding slice use one same QP, the Rice parameter which achieves the minimal bin number in the preceding slice will be selected for current slice; otherwise, the number of bins generated using the default Rice parameter (i.e., 1) in the preceding slice is scaled by TH before being compared with other Rice parameters and the Rice parameter which leads to the minimal number of bins will be selected for current slice, where TH is a predefined threshold, e.g. 0.9.

5. Rice parameter for each slice based on the values of abs_remainder that are coded in its preceding slice according to the coding order and the Rice parameter may be adjusted according to the change of coded information between the current slice and previous slice. In one specific example, the Rice parameter which achieves the minimal bin number in the preceding slice will be selected for current slice. And the Rice value may be adjusted when ΔQ is larger than TH, where ΔQ is calculated as abs (QPcurrent–QPprevious) and TH is a predefined threshold. Rice parameter (e.g., 0, 5). The adjustment may be adding a predefined offset (e.g., +1, –1) or scaling by a predefined value.

Bitstream Constraint

In one or more examples of the disclosure, it is proposed to disable the presence of Rice parameter for transform skip residual coding and high bit depth tools for low bit-depth coding. In one specific example, to fulfill such purpose, it is proposed to add a requirement of bitstream conformance which indicates such a tool shall be disabled for bit-depth less than or equal to 10 in a profile definition like HEVC or its semantic.

For example, sps_ts_residual_coding_rice_present_in_sh_flag equal to 1 specifies that sh_ts_residual_coding_rice_idx could be present in SH syntax structures referring to the SPS. The change to current VVC working draft is below.

It is a requirement of bitstream conformance that the value of sps_ts_residual_coding_rice_present_in_sh_flag shall be equal to 0 when BitDepth is less than or equal to 10.

In another example, sps_rrc_rice_extension_flag equal to 1 specifies that an extension of Rice parameter derivation for the binarization of abs_remaining[ ] and dec_abs_level[ ] is enabled. sps_rrc_rice_extension_flag equal to 0 specifies that the extension of Rice parameter derivation for the binarization of abs_remaining[ ] and dec_abs_level[ ] is disabled. According to the disclosure, the change to current VVC working draft is below.

It is a requirement of bitstream conformance that the value of sps_rrc_rice_extension_flag shall be equal to 0 when BitDepth is less than or equal to 10.

In yet another example, sps_persistent_rice_adaptation_enabled_flag equal to 1 specifies that Rice parameter derivation for the binarization of abs_remainder[ ] and dec_abs_level[ ] is initialized at the start of each TU using statistics accumulated from previous TUs. sps_persistent_rice_adaptation_enabled_flag equal to 0 specifies that no previous TU state is used in Rice parameter derivation. According to the disclosure, the change to current VVC working draft is below.

It is a requirement of bitstream conformance that the value of sps_persistent_rice_adaptation_enabled_flag shall be equal to 0 when BitDepth is less than or equal to 10.

In yet another example, sps_reverse_last_sig_coeff_enabled_flag equal to 1 specifies that sh_reverse_last_sig_coeff_flag is present in slice_header( ) syntax structure referring to the SPS. sps_reverse_last_sig_coeff_enabled_flag equal to 0 specifies that sh_reverse_last_sig_coeff_flag is not present in slice_header( ) syntax structure referring to the SPS. According to the disclosure, the change to current VVC working draft is below.

It is a requirement of bitstream conformance that the value of sps_reverse_last_sig_coeff_enabled_flag shall be equal to 0 when BitDepth is less than or equal to 10.

In yet another example, sps_high_throughput_flag equal to 1 specifies that the syntax elements in residual coding are coded through bypass mode. According to the disclosure, the change to current VVC working draft is below.

It is a requirement of bitstream conformance that the value of sps_high_throughput_flag shall be equal to 0 when BitDepth is less than or equal to 10.

Moreover, it is worth to mention that the proposed bitstream conformance constraint sps_ts_residual_coding_rice_present_in_sh_flag on coding bit depth is orthogonal to the conditioned signal of the slice level flag on the transform skip flag, i.e., sps_transform_skip_enabled_flag. In an embodiment, in such combination, the flag sps_transform_skip_enabled_flag is used to condition the presence of sps_ts_residual_coding_rice_present_in_sh_flag. Meanwhile, the conformance bitstream is also applied to require that the sps_ts_residual_coding_rice_present_in_sh_flag can only be equal to 1 when only the value of coding bit depth is greater than 10. The following illustrates the SPS syntax table and semantic changes when such method is applied:

| sps_range_extension( ) { | Descriptor |
|---|---|
| ... | |
| if( sps_transform_skip_enabled_flag ) | |
|    sps_ts_residual_coding_rice_present_in_sh_flag | u(1) |
| ... | |
| } | | sps_ts_residual_coding_rice_present_in_sh_flag equal to 1 specifies that sh_ts_residual_coding_rice_idx could be present in SH syntax structures referring to the SPS. The change to current VVC working draft is below.

It is a requirement of bitstream conformance that the value of sps_ts_residual_coding_rice_present_in_sh_flag shall be equal to 0 when BitDepth is less than or equal to 10.

FIG. 22 shows a method for video decoding according to one example of the present disclosure. The method may be, for example, applied to a decoder. In Step 3202, the decoder may determine a coding bit depth for at least one sample in a bitstream. In Step 3204, the decoder may determine a value of a first SPS flag for the at least one sample. In Step 3206, the decoder may determine a second SPS flag for the at least one sample based on the value of the first SPS flag, in combination of a coding bit depth for the at least one sample. In some examples, the decoder may determine a presence of the second SPS flag based on the first SPS flag, or determine a value of the second SPS flag based on the coding bit depth. In some examples, the decoder may determine a presence of the second SPS flag based on the first SPS flag and the coding bit depth. In some examples, the decoder may determine a value of the second SPS flag based on the first SPS flag and the coding bit depth. In some other examples, the decoder may determine a value of the second SPS flag based on the coding bit depth, regardless a value of the first SPS flag.

In another embodiment, instead of applying bitstream conformance, it is proposed to directly use the bit depth as well as the flag sps_transform_skip_enabled_flag to condition the signaling of the flag sps_ts_residual_coding_rice_present_in_sh_flag. Specifically, by such method, the value of the flag sps_ts_residual_coding_rice_present_in_sh_flag is only signaled when sps_transform_skip_enabled_flag is equal to 1 and the coding bit depth is greater than 10, as illustrated as

| sps_range_extension( ) { | Descriptor |
|---|---|
| ... | |
| if( sps_transform_skip_enabled_flag && BitDepth > 10 ) | |
|    sps_ts_residual_coding_rice_present_in_sh_flag | u(1) |
| ... | |
| } | |

Figure 16:
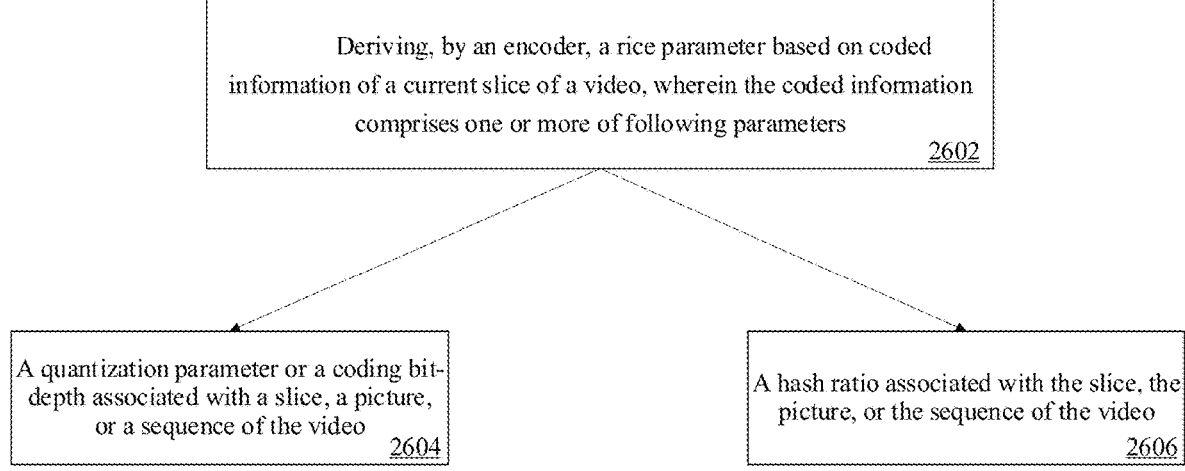
FIG. 16 illustrates a low-delay transform skip residual coding (TSRC) method according to an example of the present disclosure.

FIG. 16 shows a flow chart of a low-delay transform skip residual coding (TSRC) method according to one example of the present disclosure. The method may be, for example, applied to an encoder. In Step 2602, the encoder may derive a rice parameter based on coded information of a current slice of a video. The coded information may include one or more of the following parameters: a quantization parameter or a coding bit-depth associated with a slice, a picture, or a sequence of the video; or a hash ratio associated with the slice, the picture, or the sequence of the video.

It is noted that the above encoder methods may be applied in decoder side. In one specific example, the Rice parameter does not need to be signaled to decoder and encoder/decoder use the same method to derive the Rice parameter.

FIG. 8 shows a computing environment 1810 coupled with a user interface 1860. The computing environment 1810 can be part of a data processing server. The computing environment 1810 includes processor 1820, memory 1840, and I/O interface 1850.

The processor 1820 typically controls overall operations of the computing environment 1810, such as the operations associated with the display, data acquisition, data communications, and image processing. The processor 1820 may include one or more processors to execute instructions to perform all or some of the steps in the above-described methods. Moreover, the processor 1820 may include one or more modules that facilitate the interaction between the processor 1820 and other components. The processor may be a Central Processing Unit (CPU), a microprocessor, a single chip machine, a GPU, or the like.

The memory 1840 is configured to store various types of data to support the operation of the computing environment 1810. Memory 1840 may include predetermine software 1842. Examples of such data include instructions for any applications or methods operated on the computing environment 1810, video datasets, image data, etc. The memory 1840 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 1850 provides an interface between the processor 1820 and peripheral interface modules, such as a keyboard, a click wheel, buttons, and the like. The buttons may include but are not limited to, a home button, a start scan button, and a stop scan button. The I/O interface 1850 can be coupled with an encoder and decoder.

In some embodiments, there is also provided a non-transitory computer-readable storage medium comprising a plurality of programs, such as comprised in the memory 1840, executable by the processor 1820 in the computing environment 1810, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 1810 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

FIG. 13 is a block diagram illustrating an exemplary system 10 for encoding and decoding video blocks in parallel in accordance with some implementations of the present disclosure. As shown in FIG. 13, the system 10 includes a source device 12 that generates and encodes video data to be decoded at a later time by a destination device 14. The source device 12 and the destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may comprise any type of communication medium or device capable of moving the encoded video data from the source device 12 to the destination device 14. In one example, the link 16 may comprise a communication medium to enable the source device 12 to transmit the encoded video data directly to the destination device 14 in real time. The encoded video data may be modulated according to a communication standard, such as a wireless communication protocol, and transmitted to the destination device 14. The communication medium may comprise any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may hold the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or a combination of both that is suitable for accessing encoded video data stored on a file server. The transmission of the encoded video data from the storage device 32 may be a streaming transmission, a download transmission, or a combination of both.

As shown in FIG. 13, the source device 12 includes a video source 18, a video encoder 20 and the output interface 22. The video source 18 may include a source such as a video capturing device, e.g., a video camera, a video archive containing previously captured video, a video feeding interface to receive video from a video content provider, and/or a computer graphics system for generating computer graphics data as the source video, or a combination of such sources. As one example, if the video source 18 is a video camera of a security surveillance system, the source device 12 and the destination device 14 may form camera phones or video phones. However, the implementations described in the present application may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data to a user, and may comprise any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present application is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Figure 14:
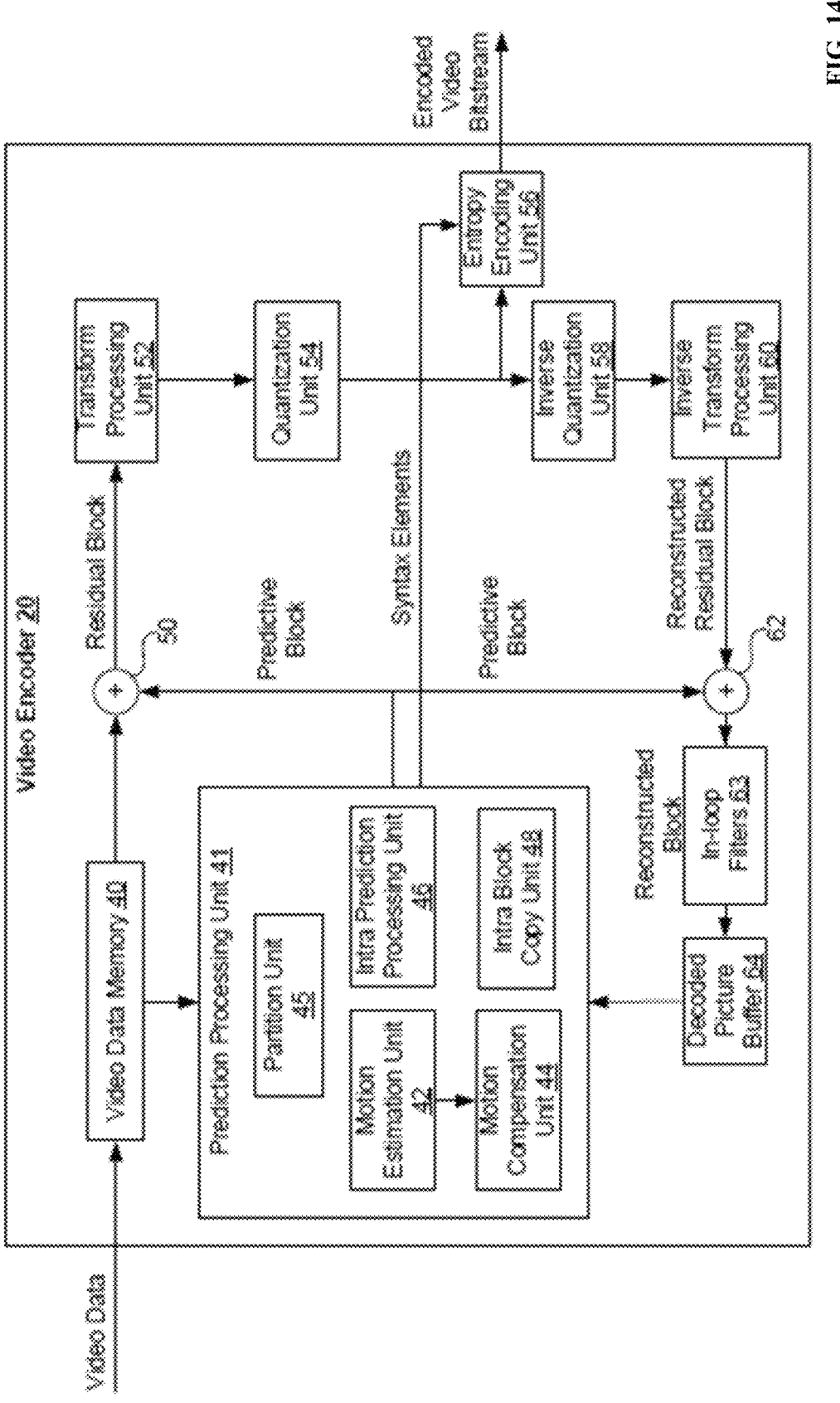
FIG. 14 is a block diagram illustrating an exemplary video encoder according to an example of the present disclosure.

FIG. 14 is a block diagram illustrating an exemplary video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. It should be noted that the term "frame" may be used as synonyms for the term "image" or "picture" in the field of video coding.

As shown in FIG. 14, the video encoder 20 includes a video data memory 40, a prediction processing unit 41, a Decoded Picture Buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove blockiness artifacts from reconstructed video. Another in-loop filter, such as Sample Adaptive Offset (SAO) filter and/or Adaptive in-Loop Filter (ALF), may also be used in addition to the deblocking filter to filter an output of the summer 62. In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 13. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 14, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values. A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning or Triple-Tree (TT) partitioning or any combination thereof. It should be noted that the term "block" or "video block" as used herein may be a portion, in particular a rectangular (square or non-square) portion, of a frame or a picture. With reference, for example, to HEVC and VVC, the block or video block may be or correspond to a Coding Tree Unit (CTU), a CU, a Prediction Unit (PU) or a Transform Unit (TU) and/or may be or correspond to a corresponding block, e.g., a Coding Tree Block (CTB), a Coding Block (CB), a Prediction Block (PB) or a Transform Block (TB) and/or to a sub-block.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information, to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference video frame, according to a predetermined pattern within a sequence of video frames. Motion estimation, performed by the motion estimation unit 42, is the process of generating motion vectors, which estimate motion for video blocks. A motion vector, for example, may indicate the displacement of a video block within a current video frame or picture relative to a predictive block within a reference frame relative to the current block being coded within the current frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vector.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual video block of pixel difference values by subtracting pixel values of the predictive block provided by the motion compensation unit 44 from the pixel values of the current video block being coded. The pixel difference values forming the residual video block may include luma or chroma difference components or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. Note that the motion estimation unit 42 and the motion compensation unit 44 may be highly integrated, but are illustrated separately for conceptual purposes.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or a different frame according to inter prediction, the video encoder 20 may form a residual video block by subtracting pixel values of the predictive block from the pixel values of the current video block being coded, forming pixel difference values. The pixel difference values forming the residual video block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. To do so, the intra prediction processing unit 46 may encode a current block using various intra prediction modes, e.g., during separate encoding passes, and the intra prediction processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in the bitstream.

After the prediction processing unit 41 determines the predictive block for the current video block via either inter prediction or intra prediction, the summer 50 forms a residual video block by subtracting the predictive block from the current video block. The residual video data in the residual block may be included in one or more TUs and is provided to the transform processing unit 52. The transform processing unit 52 transforms the residual video data into residual transform coefficients using a transform, such as a Discrete Cosine Transform (DCT) or a conceptually similar transform.

The transform processing unit 52 may send the resulting transform coefficients to the quantization unit 54. The quantization unit 54 quantizes the transform coefficients to further reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 entropy encodes the quantized transform coefficients into a video bitstream using, e.g., Context Adaptive Variable Length Coding (CAVLC), Context Adaptive Binary Arithmetic Coding (CABAC), Syntax-based context-adaptive Binary Arithmetic Coding (SBAC), Probability Interval Partitioning Entropy (PIPE) coding or another entropy encoding methodology or technique. The encoded bitstream may then be transmitted to the video decoder 30 as shown in FIG. 13, or archived in the storage device 32 as shown in FIG. 13 for later transmission to or retrieval by the video decoder 30. The entropy encoding unit 56 may also entropy encode the motion vectors and the other syntax elements for the current video frame being coded.

The inverse quantization unit 58 and the inverse transform processing unit 60 apply inverse quantization and inverse transformation, respectively, to reconstruct the residual video block in the pixel domain for generating a reference block for prediction of other video blocks. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42 and the motion compensation unit 44 as a predictive block to inter predict another video block in a subsequent video frame.

Figure 15:
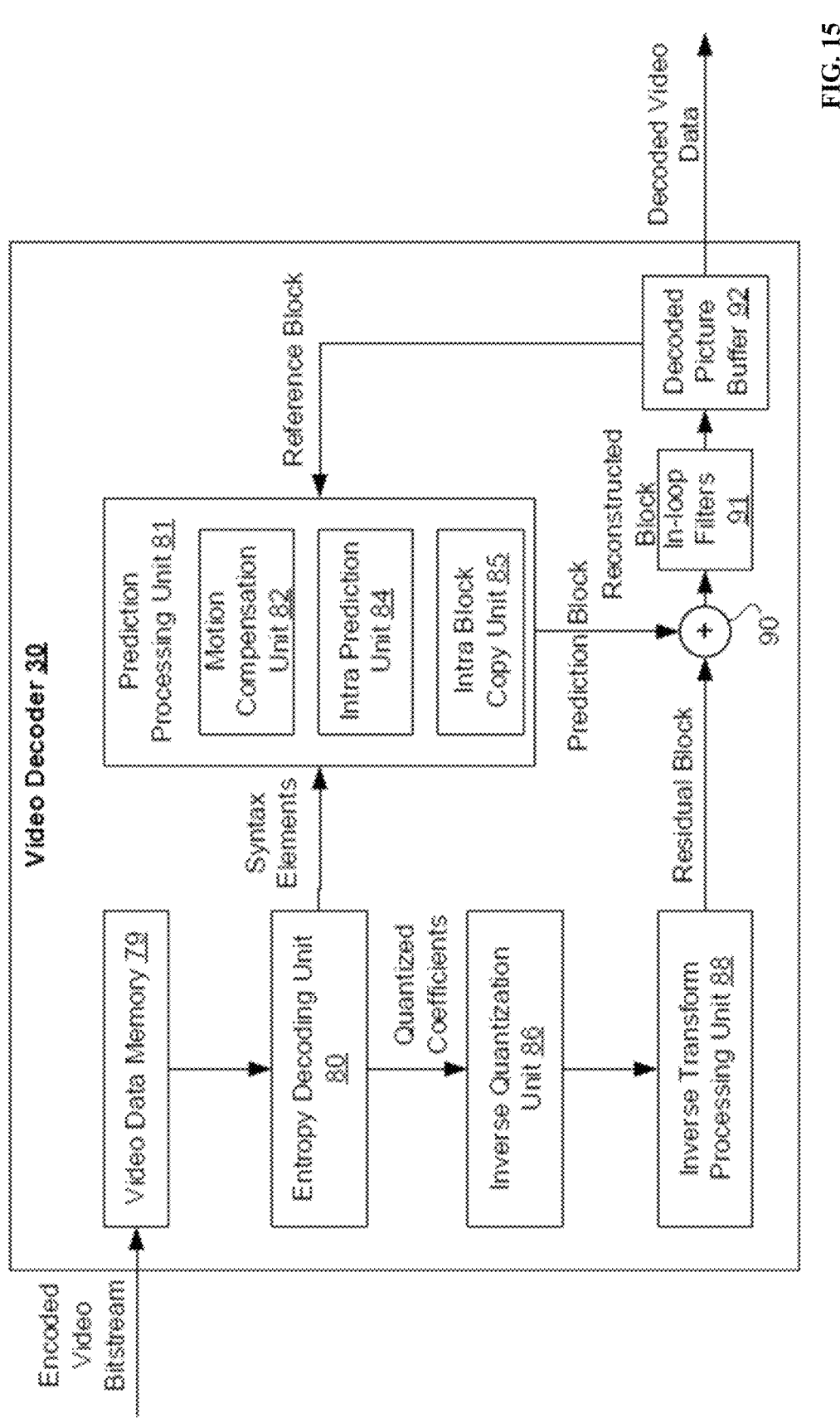
FIG. 15 is a block diagram illustrating an exemplary video decoder according to an example of the present disclosure.

FIG. 15 is a block diagram illustrating an exemplary video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 14. For example, the motion compensation unit 82 may generate prediction data based on motion vectors received from the entropy decoding unit 80, while the intra-prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purpose, the video data memory 79 and the DPB 92 are depicted as two distinct components of the video decoder 30 in FIG. 15. But it will be apparent to one skilled in the art that the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 entropy decodes the bitstream to generate quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block defined by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inverse quantizes the quantized transform coefficients provided in the bitstream and entropy decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs decoded video block for the current video block by summing the residual block from the inverse transform processing unit 88 and a corresponding predictive block generated by the motion compensation unit 82 and the intra BC unit 85. An in-loop filter 91 such as deblocking filter, SAO filter and/or ALF may be positioned between the summer 90 and the DPB 92 to further process the decoded video block. In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 13.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video decoding, comprising:
determining, by a decoder, a value of a coding bit depth;
determining, by the decoder, a value of a first Sequence Parameter Set (SPS) flag, wherein the first SPS flag is a transform skip enabled flag; and
determining, by the decoder, a second SPS flag based on the value of the first SPS flag and the value of the coding bit depth.

2. The method for video decoding of claim 1, wherein determining the second SPS flag based on the value of the first SPS flag and the value of the coding bit depth comprises:
determining a presence of the second SPS flag based on the value of the first SPS flag and the value of the coding bit depth.

3. The method for video decoding of claim 1, wherein determining the second SPS flag based on the value of the first SPS flag and the value of the coding bit depth comprises:
determining a value of the second SPS flag based on the value of the first SPS flag and the value of the coding bit depth.

4. The method for video decoding of claim 3, wherein determining a value of the second SPS flag based on the value of the first SPS flag and the value of the coding bit depth comprises:
in response to determining that the value of the first SPS flag equals to 0 and the value of the coding bit depth is greater than 10, determining that the value of the second SPS flag equals to 0.

5. The method for video decoding of claim 1, further comprising:
in response to determining that a value of the second SPS flag equals to 1, determining that information of a slice header (SH) transform skip residual coding rice index is possible to be present in SH syntax structures referring to the SPS.

6. The method for video decoding of claim 2, wherein determining a presence of the second SPS flag based on the value of the first SPS flag and the value of the coding bit depth comprises:

in response to determining that the value of the first SPS flag equals to 1 and the value of the coding bit depth is greater than 10, determining that the second SPS flag is present.

7. The method for video decoding of claim 1, wherein the value of the coding bit depth is any of the followings: 11, 12, 13, 14, 15 or 16.

8. An apparatus for video decoding, comprising:

one or more processors; and a memory configured to store instructions executable by the one or more processors; wherein the one or more processors, upon execution of the instructions, are configured to perform operations comprising:

determining a value of a coding bit depth;

determining a value of a first Sequence Parameter Set (SPS) flag, wherein the first SPS flag is a transform skip enabled flag; and determining a second SPS flag based on the value of the first SPS flag and the value of the coding bit depth.

9. The apparatus of claim 8, wherein determining the second SPS flag based on the value of the first SPS flag and the value of the coding bit depth comprises:

determining a presence of the second SPS flag based on the value of the first SPS flag and the value of the coding bit depth.

10. The apparatus of claim 8, wherein determining the second SPS flag based on the value of the first SPS flag and the value of the coding bit depth comprises:

determining a value of the second SPS flag based on the value of the first SPS flag and the value of the coding bit depth.

11. The apparatus of claim 10, wherein determining a value of the second SPS flag based on the value of the first SPS flag and the value of the coding bit depth comprises:

in response to determining that the value of the first SPS flag equals to 0 and the value of the coding bit depth is greater than 10, determining that the value of the second SPS flag equals to 0.

12. The apparatus of claim 8, wherein the operations further comprise:

in response to determining that a value of the second SPS flag equals to 1, determining that information of a slice header (SH) transform skip residual coding rice index is possible to be present in SH syntax structures referring to the SPS.

13. The apparatus of claim 9, wherein determining a presence of the second SPS flag based on the value of the first SPS flag and the value of the coding bit depth comprises:

in response to determining that the value of the first SPS flag equals to 1 and the value of the coding bit depth is greater than 10, determining that the second SPS flag is present.

14. The apparatus of claim 8, wherein the value of the coding bit depth is any of the followings: 11, 12, 13, 14, 15 or 16.

15. A non-transitory computer-readable storage medium for video decoding storing computer-executable instructions that, when executed by one or more computer processors, cause the one or more computer processors to store a bitstream and to perform operations with the bitstream, the operations comprising:

determining a value of a coding bit depth;

determining a value of a first Sequence Parameter Set (SPS) flag, wherein the first SPS flag is a transform skip enabled flag; and determining a second SPS flag based on the value of the first SPS flag and the value of the coding bit depth.

* * * * *